US010181158B2

(12) United States Patent
Oberlechner et al.

(10) Patent No.: US 10,181,158 B2
(45) Date of Patent: Jan. 15, 2019

(54) METHODS AND SYSTEMS FOR DEPICTING PSYCHOLOGICAL ANALYSIS

(71) Applicant: Addepar, Inc., Mountain View, CA (US)

(72) Inventors: Thomas Johannes Oberlechner, San Francisco, CA (US); Edward Casteel Milner, Dallas, TX (US); Julia Pitters, Vienna (AT)

(73) Assignee: ADDEPAR, INC., Mountain View, CA (US)

( * ) Notice: Subject to any disclaimer, the term of this patent is extended or adjusted under 35 U.S.C. 154(b) by 437 days.

(21) Appl. No.: 14/571,984

(22) Filed: Dec. 16, 2014

(65) Prior Publication Data

US 2016/0171609 A1 Jun. 16, 2016

Related U.S. Application Data

(63) Continuation-in-part of application No. 14/025,616, filed on Sep. 12, 2013.
(Continued)

(51) Int. Cl.
*G06Q 40/06* (2012.01)
*G06Q 30/02* (2012.01)
(Continued)

(52) U.S. Cl.
CPC ......... *G06Q 40/06* (2013.01); *G06Q 30/0269* (2013.01); *G06Q 30/0282* (2013.01);
(Continued)

(58) Field of Classification Search
None
See application file for complete search history.

(56) References Cited

U.S. PATENT DOCUMENTS

| | | |
|---|---|---|
| 6,099,319 A | 8/2000 | Zaltman et al. |
| 6,463,431 B1 | 10/2002 | Schmitt |

(Continued)

FOREIGN PATENT DOCUMENTS

| | | | |
|---|---|---|---|
| WO | WO-0167334 A2 * | 9/2001 | ............ G06Q 40/08 |
| WO | WO 2006/105576 | 10/2006 | |
| WO | WO 2014/193585 | 10/2014 | |

OTHER PUBLICATIONS

"U.S. Appl. No. 14/025,616, Non Final Office Action dated May 22, 2015", 19 pgs.
(Continued)

*Primary Examiner* — Abhishek Vyas
*Assistant Examiner* — James H Miller
(74) *Attorney, Agent, or Firm* — Knobbe, Martens, Olson & Bear, LLP

(57) ABSTRACT

Systems and methods are presented for providing a psychological analysis of financial products in an investor's financial portfolio. In some example embodiments, a method is presented. The method may include accessing, in a device comprising one or more processors, a psychometric data of a financial product, the psychometric data quantifying a decision-making tendency used in managing the financial product. The method may also include generating a psychological behavioral characteristic score of the financial product based on the accessed psychometric data, the psychological behavioral characteristic score indicating a degree to which the financial product exhibits a psychological characteristic relative to other financial products, generating an image of a graph that depicts the psychological behavioral characteristics score of the financial product relative to an axis that represents a range of degrees to which the psychological characteristic is exhibited by the other financial products, and causing display of the image of the graph.

14 Claims, 15 Drawing Sheets

Related U.S. Application Data

(60) Provisional application No. 61/829,146, filed on May 30, 2013, provisional application No. 61/743,930, filed on Sep. 15, 2012.

(51) Int. Cl.
*G06Q 30/06* (2012.01)
*G06Q 40/08* (2012.01)

(52) U.S. Cl.
CPC ......... *G06Q 30/06* (2013.01); *G06Q 30/0631* (2013.01); *G06Q 40/08* (2013.01)

(56) References Cited

U.S. PATENT DOCUMENTS

| | | | |
|---|---|---|---|
| 6,839,686 B1 | 1/2005 | Galant | |
| 7,383,219 B1 | 6/2008 | Jennings et al. | |
| 7,689,501 B1 | 3/2010 | Gastineau et al. | |
| 7,711,617 B2 | 5/2010 | Rachev | |
| 8,468,078 B2 | 6/2013 | Vioni et al. | |
| 8,629,872 B1 | 1/2014 | Phoa | |
| 8,666,877 B2 | 3/2014 | Kumar et al. | |
| 9,721,300 B2 | 8/2017 | Markov | |
| 2001/0025266 A1 | 9/2001 | Gastineau et al. | |
| 2001/0044739 A1 | 11/2001 | Bensemana | |
| 2002/0019790 A1 | 2/2002 | Edgar et al. | |
| 2002/0045154 A1 | 4/2002 | Wood et al. | |
| 2002/0095362 A1 | 7/2002 | Masand et al. | |
| 2003/0088492 A1 | 5/2003 | Damschroder | |
| 2003/0130923 A1 | 7/2003 | Charnley, Jr. | |
| 2004/0049448 A1 | 3/2004 | Glickman | |
| 2005/0149424 A1 | 7/2005 | Weinberger | |
| 2005/0246255 A1 | 11/2005 | Rousseau et al. | |
| 2005/0278245 A1* | 12/2005 | Celati ................ | G06Q 10/0635 705/38 |
| 2006/0212376 A1 | 9/2006 | Snyder et al. | |
| 2007/0112662 A1 | 5/2007 | Kumar | |
| 2007/0299785 A1 | 12/2007 | Tulberg | |
| 2008/0071702 A1 | 3/2008 | Howard et al. | |
| 2009/0048958 A1 | 2/2009 | Gardner et al. | |
| 2009/0157630 A1* | 6/2009 | Yuan ................ | G06F 17/30864 |
| 2009/0292648 A1 | 11/2009 | Damschroder et al. | |
| 2009/0307149 A1 | 12/2009 | Markov et al. | |
| 2009/0327155 A1 | 12/2009 | Dial et al. | |
| 2010/0030701 A1 | 2/2010 | Dubois | |
| 2010/0235299 A1 | 9/2010 | Considine | |
| 2010/0332410 A1 | 12/2010 | Brown et al. | |
| 2011/0270780 A1 | 11/2011 | Davies et al. | |
| 2012/0078810 A1 | 3/2012 | McGrath | |
| 2012/0116996 A1 | 5/2012 | Varma et al. | |
| 2012/0130884 A1 | 5/2012 | Ellis et al. | |
| 2012/0185361 A1 | 7/2012 | Demirjian | |
| 2012/0246094 A1 | 9/2012 | Hsu et al. | |
| 2014/0081768 A1 | 3/2014 | Hocking, Jr. et al. | |
| 2014/0317019 A1 | 10/2014 | Papenbrock et al. | |
| 2015/0199746 A1 | 7/2015 | Hocking, Jr. et al. | |
| 2016/0035032 A1 | 2/2016 | Twombly et al. | |
| 2016/0171608 A1 | 6/2016 | Milner et al. | |
| 2016/0239918 A1 | 8/2016 | Lambur et al. | |

OTHER PUBLICATIONS

"U.S. Appl. No. 14/025,616, Response filed Aug. 24, 2015 to Non Final Office Action dated May 22, 2015", 27 pgs.

"U.S. Appl. No. 14/668,091, Non Final Office Action dated Jun. 4, 2015", 18 pgs

"U.S. Appl. No. 14/668,091, Preliminary Amendment filed Mar. 26, 2015", 11 pgs.

"U.S. Appl. No. 14/668,091, Response filed Sep. 3, 2015 to Non Final Office Action dated Jun. 4, 2015", 27 pgs.

"U.S. Appl. No. 14/668,091, Supplemental Preliminary Amendment filed Apr. 22, 2015", 10 pgs.

"U.S. Appl. No. 14/025,616 Preliminary Amendment filed Feb. 24, 2015", 11 pgs.

International Application Serial No. PCT/US2014/035894, International Search Report dated Sep. 18, 2014, 2pgs.

International Application Serial No. PCT/US2014/035894, Written Opinion dated Sep. 18, 2014, 7 pgs.

Allison, David, "Matching Investing Risk Tolerance to Personality", http://www.investopedia.com/articles/professionaleducation/09/risk-tolerance-personality-typing.asp, (Sep. 8, 2009), 2 pgs.

Lo, Andrew W., "Risk Management for Hedge Funds: The need for a set of risk management protocols designed for hedge fund investments has never been more pressing", Canadian Investment Review, (2002), 29-31.

Lo, Andrew W., "The Adaptive Markets Hypothesis: Market Efficiency from an Evolutionary Perspective", (Aug. 15, 2004), 33 pgs.

Oberlechner, Thomas, et al., "Surfing the money tides: Understanding the foreign exchange market through metaphors", British Journal of Social Psychology, (2004), 133-156.

Oberlechner, Thomas, "The Role of Metaphors in Financial Market Predictions and Trading Decisions", IAREP/SABE World Meeting 2008 at LUISS, (Sep. 4, 2008), 32 pgs.

Paredes, Troy A., "On the Decision to Regulate Hedge Funds: The SEC's Regulatory Philosophy, Styler, and Mission", University of Illinois Law Review, vol. 2006, (Sep. 8, 2006), 975-1036.

"Imatchative targets institutional investors with online AltX hedge fund research solution," Hedgeweek, Sep. 7, 2014, <http://www.hedgeweek.com/2014/07/09/207056/imatchative-targets-institutional-investors-online-altx-hedge-fund-search-solution>, 1 page.

Bedigian, Louis, "Serial Entrepreneur Jeffrey Schwartz Targets Hedge Funds With New Startup, Hedgez", Benzinga, Dec. 19, 2013, <https://www.benzinga.com/general/entrepreneurship/13/12/4166274/serial-entrepreneur-jeffrey-schwartz-targets-hedge-funds-with>, 2 pages.

\* cited by examiner

Graphical Analysis based on Quasi-Psychological Data

Graphical Analysis based on Psychological Data

METHODS AND SYSTEMS FOR DEPICTING PSYCHOLOGICAL ANALYSIS

CROSS REFERENCE TO RELATED APPLICATIONS

This application is a continuation-in-part of U.S. Non-Provisional application Ser. No. 14/025,616, filed Sep. 12, 2013 and titled "RECOMMENDATION MACHINE," which claims the priority benefits of U.S. Provisional Patent Application No. 61/743,930, filed Sep. 15, 2012, and U.S. Provisional Patent Application No. 61/829,146, filed May 30, 2013, each of which are incorporated herein by reference in their entirety and for all purposes.

TECHNICAL FIELD

The subject matter disclosed herein generally relates to processing data. In some example embodiments, the present disclosures relate to systems and methods for providing psychological portfolio analysis for financial investment products and displaying the analysis via a user-interface tool.

BRIEF DESCRIPTION OF THE DRAWINGS

Some embodiments are illustrated by way of example and not limitation in the figures of the accompanying drawings.

DETAILED DESCRIPTION

Figure 1:
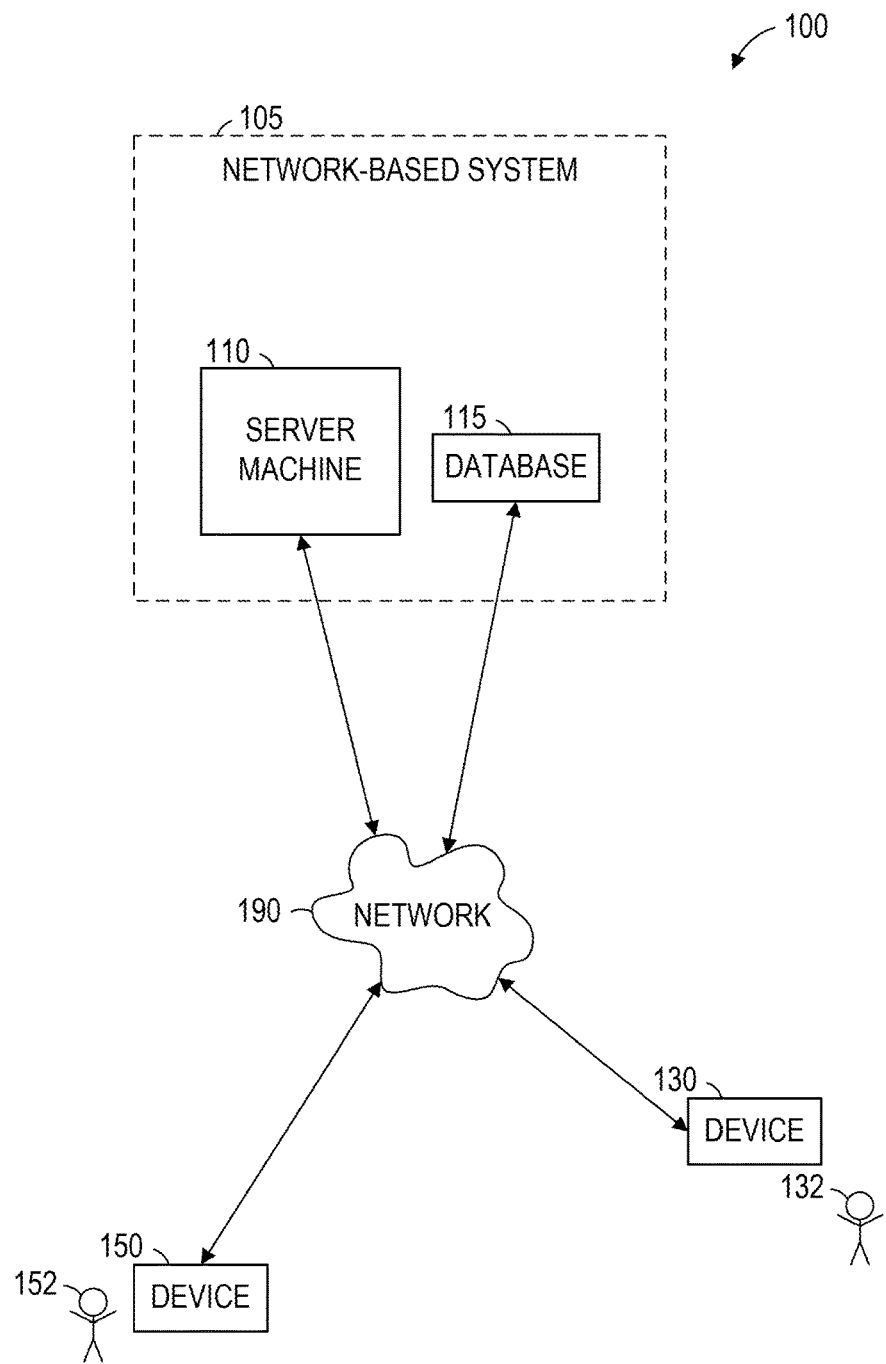
FIG. 1 is a network diagram illustrating an example network environment suitable for providing psychological analyses of financial products, according to some example embodiments.

Example methods, apparatuses, and systems (e.g., machines) are presented for providing a psychological analysis of financial products in an investor's financial portfolio. In some example embodiments, a graphical psychological portfolio analysis tool is presented that processes various psychometric data about one or more financial products in an investor's portfolio and displays at least one graphical psychological measurement of the one or more financial products based on the psychometric data. As used herein, psychometric data can include psychological data and quasi-psychological data, both of which will be described in more detail below. In some example embodiments, the psychometric data of a financial product represent decision-making tendencies of the financial product, including, for example, the decision-making behaviors of a fund manager of the financial product, and the decision-making behaviors of a company in control of the financial product. This contrasts with analyses of financial products that tend to describe the financial product based on the outcomes of the decisions made by fund managers, rather than the actual process of decision-making (e.g., prior to those outcomes). That is, in some example embodiments, the psychometric data represent decision-making tendencies and behaviors of the financial product, where the resulting decisions based on the decision-making tendencies and behaviors result in performance outcomes of the financial product. In some example embodiments, one or more psychometric datum of the financial product may be represented as a psychological measurement of the financial product that can be displayed in graphical form.

In some example embodiments, the psychological measurements of a financial product are expressed in one or more behavioral dimensions. For example, the behavioral dimensions can include a degree of safety vs. growth of the financial product, a degree of agility vs. steadiness of the financial product, and a degree of conventionality vs. originality of the financial product compared to other financial products. These behavioral dimensions will be described in more detail, below.

In some example embodiments, the graphical psychological portfolio analysis tool (also referred to herein as a graphical analysis tool) also provides a comparison of the psychological measurements of the financial products with the investor's own psychological preferences regarding financial investing. A graphical superposition of the psychological measurements of the financial products and the investor's own psychological preferences may allow the investor to visually assess how well-aligned the investor's portfolio of financial products compares to his own psychological preferences, and can therefore provide convenient and insightful information when making financial investment decisions.

Examples merely demonstrate possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Referring to FIG. 1, a network diagram illustrating an example network environment 100 suitable for providing psychological analyses of financial products is shown, according to some example embodiments. As used herein, a financial product can refer to an agreement between an investor and an investment entity used to manage money of the investor. A financial product may define a structure and set of rules for managing the money and may include financial capital from the investor. Financial products typically may be governed by financial laws and regulations. Examples of a financial product can include a hedge fund, bond, stock, mutual fund, insurance policy, and the like. The example network environment 100 includes a server machine 110, a database 115, a first device 130 for a first user 132, and a second device 150 for a second user 152, all communicatively coupled to each other via a network 190. The server machine 110 may form all or part of a network-based system 105 (e.g., a cloud-based server system configured to provide one or more services to the first and second devices 130 and 150). The server machine 110, the first device 130, and the second device 150 may each be implemented in a computer system, in whole or in part, as described below with respect to FIG. 10.

Also shown in FIG. 1 are the first user 132 and the second user 152. One or both of the first and second users 132 and 152 may be a human user, a machine user (e.g., a computer configured by a software program to interact with the first device 130), or any suitable combination thereof (e.g., a human assisted by a machine or a machine supervised by a human). The first user 132 may be associated with the first device 130 and may be a user of the first device 130. For example, the first device 130 may be a desktop computer, a vehicle computer, a tablet computer, a navigational device, a portable media device, a smartphone, or a wearable device (e.g., a smart watch or smart glasses) belonging to the first user 132. Likewise, the second user 152 may be associated with the second device 150. As an example, the second device 150 may be a desktop computer, a vehicle computer, a tablet computer, a navigational device, a portable media device, a smartphone, or a wearable device (e.g., a smart watch or smart glasses) belonging to the second user 152.

Any of the machines, databases 115, or first or second devices 130 or 150 shown in FIG. 1 may be implemented in a general-purpose computer modified (e.g., configured or programmed) by software (e.g., one or more software modules) to be a special-purpose computer to perform one or more of the functions described herein for that machine, database 115, or first or second device 130 or 150. For example, a computer system able to implement any one or more of the methodologies described herein is discussed below with respect to FIG. 10. As used herein, a "database" may refer to a data storage resource and may store data structured as a text file, a table, a spreadsheet, a relational database (e.g., an object-relational database), a triple store, a hierarchical data store, any other suitable means for organizing and storing data or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 190 may be any network that enables communication between or among machines, databases 115, and devices (e.g., the server machine 110 and the first device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include, for example, one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., WiFi network or WiMax network), or any suitable combination thereof. Any one or more portions of the network 190 may communicate information via a transmission medium. As used herein. "transmission medium" may refer to any intangible (e.g., transitory) medium that is capable of communicating (e.g., transmitting) instructions for execution by a machine (e.g., by one or more processors of such a machine), and can include digital or analog communication signals or other intangible media to facilitate communication of such software.

Figure 2:
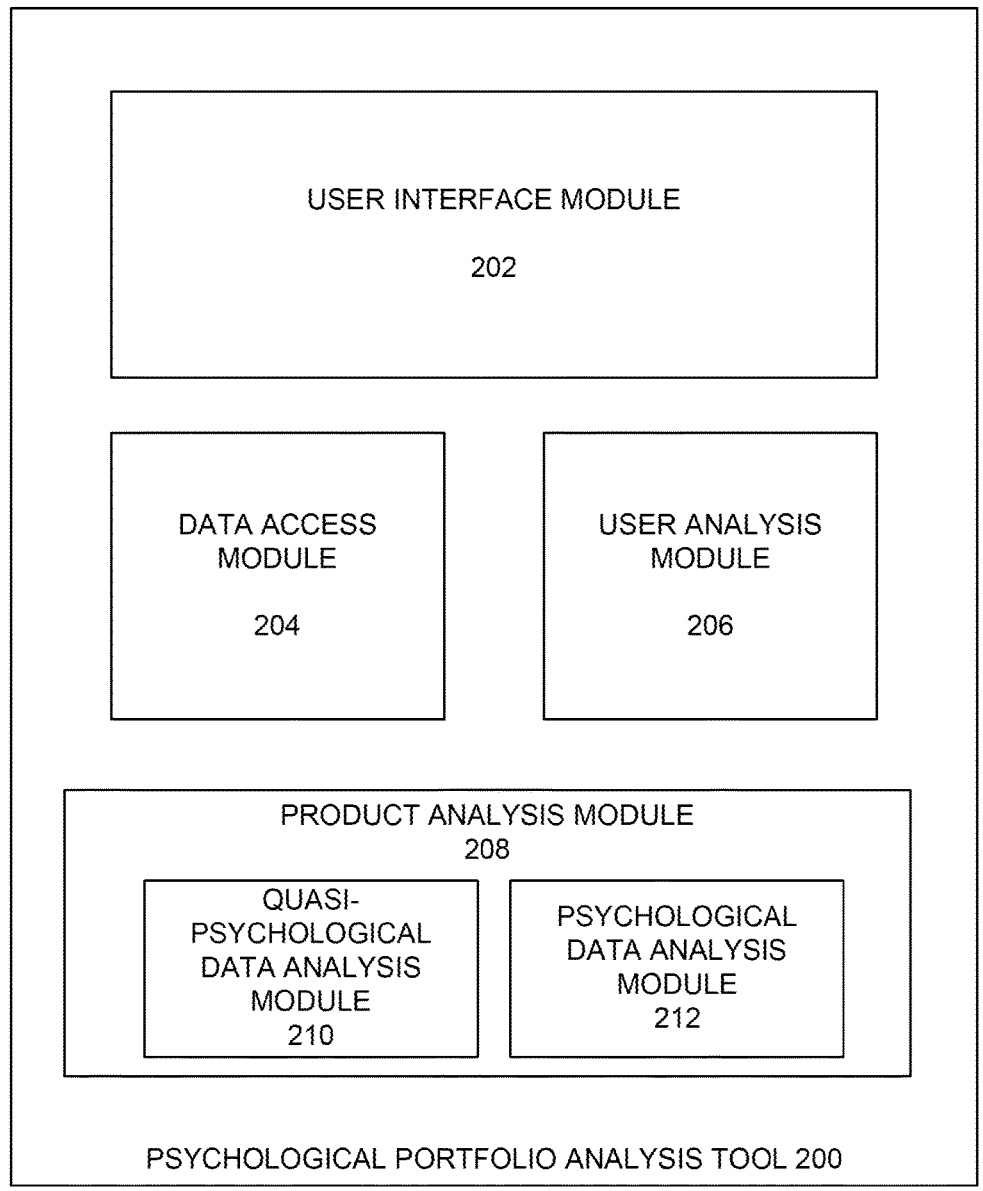
FIG. 2 is a block diagram illustrating components of a psychological portfolio analysis tool, according to some example embodiments.

Referring to FIG. 2, a block diagram illustrating components of a graphical psychological portfolio analysis tool 200 is shown, according to some example embodiments. The psychological portfolio analysis tool 200 may be an example of an application, program, or computer system in the network-based system 105 of FIG. 1, e.g., may be a part of the server machine 110, and may be suitable for providing psychological analysis of one or more financial products in a visual form. The psychological portfolio analysis tool 200 can include a user interface module 202, data access module 204, user analysis module 206, and product analysis module 208, which may all be configured to communicate with each other (e.g., via a bus, shared memory, a switch). The psychological portfolio analysis tool 200 can communicate with database 115 of FIG. 1, for example, through the data access module 204. The user analysis module 206 and product analysis module 208 can be configured to process the data provided by the data access module 204. The processed data can then be displayed in user interface module 202.

In some example embodiments, the product analysis module 208 can include quasi-psychological data analysis module 210 and psychological data analysis module 212. As used herein, quasi-psychological data of a financial product refers to objective data about the financial product, such as publically available performance data about the financial product. While quasi-psychological data relies on objective data, psychological tendencies about the financial product can still be determined based on the objective data with proper analysis. As used herein, psychological data of the financial product refers to psychological and behavioral information about managers of the financial product or companies who control the financial product, such as risk tolerance metrics of a fund manager, investment philosophies and strategies of the investment company controlling the financial product, and other psychological information that may be obtained in a psychological profile assessment, such as via methods described in U.S. patent application Ser. No. 14/025,616. The quasi-psychological data analysis module 210 and psychological data analysis module 212 may be configured to process their respective sets of data obtained through the data access module 204 to determine various behavioral dimensions about a financial product, according to some example embodiments.

Any one or more of the modules described herein may be implemented using hardware (e.g., one or more processors of a machine) or a combination of hardware and software. For example, any module described herein may configure a processor (e.g., among one or more processors of a machine) to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices. Each of the various modules described herein can be implemented at least in part by one or more processors in one or more servers of the networked-based system 105 (e.g., in a server machine 110).

Figure 3:
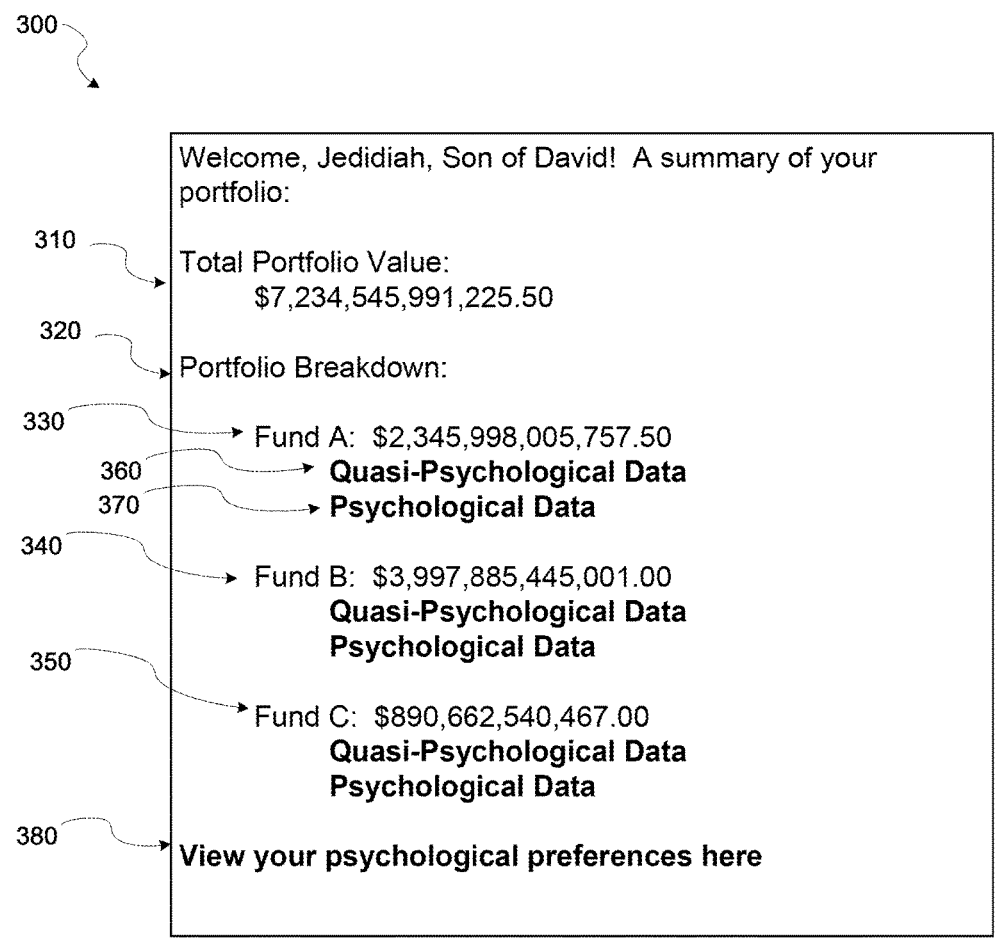
FIG. 3 is an illustration showing an example summary of several financial products in an investment portfolio of an investor, according to aspects of the present disclosure.

Referring to FIG. 3, illustration 300 shows an example summary of several financial products in an investment portfolio of an investor. The example summary may be displayed by the user interface module 202, for example. The data in the example summary may be stored in memory, such as the database 115 accessible through the data access module 204. As shown, the investor Jedidiah. Son of David may be an example of a user, such as the first user 132 or the second user 152. The investor 132 may have access to metrics about his portfolio typically found in financial statements about the portfolio, such as the total portfolio value 310, and a more itemized breakdown of the assets in the portfolio, as shown in portfolio breakdown 320. As an example, investor 132 may have three financial products in this portfolio: Fund A 330, Fund B 340, and Fund C 350. Each of the funds 330, 340 and 350 may be some type of financial product, such as a hedge fund, a mutual fund, a collection of individual stocks, and so forth. Each of the funds 330, 340 and 350 may be managed by a fund manager, which may be under the auspices of a financial company, such as Goldman Sachs® or Charles Schwab®.

The investor 132 may desire to assess how aligned his investment tendencies are with the decision-making behaviors of the funds 330, 340, and 350 in his portfolio. As alluded to earlier, the behaviors of a fund described herein refer to behavioral characteristics that drive how decisions are made for the fund, where the decisions based on these behaviors result in performance outcomes of the fund. As such, the behaviors or behavioral tendencies of a fund described herein relate to the process of decision-making of a fund, rather than the actual outcomes of the fund. As one option, the investor 132 may examine publically available financial data, such as historical performance data (e.g., performance outcomes of a fund), to get a sense of how the funds 330, 340, and 350 behave. However, through aspects of the present disclosure, the investor 132 can also analyze the funds 330, 340, and 350 not merely based on the financial outcomes (e.g. the performance), but also based on any underlying behavioral psychological characteristics of the funds (e.g., decision-making behaviors or tendencies). For example, the investment choices of the funds 330, 340, and 350 may be based on the management decisions of the fund manager, and the investment philosophies of the financial company holding the fund. Understanding the behavioral psychological characteristics of the decision makers of the funds can therefore help describe, and in some cases predict, how the fund will behave.

Thus, in some example embodiments, each fund, e.g, funds 330, 340, and 350, may have corresponding quasi-psychological data 360 and/or psychological data 370 that can be processed to describe the behavioral characteristics of each fund. In this case, the illustration 300 of the investor's 132 portfolio contains hyperlinks to descriptions of the quasi-psychological data 360 and psychological data 370 for each fund 330, 340, and 350, as shown. As previously mentioned, quasi-psychological data of a fund can refer to objective data about the fund, such as publically available performance data about the fund. Psychological data of the fund can refer to psychological and behavioral information about entities who manage the fund and guide its investment choices. In this case, more information about the quasi-psychological data 360 and psychological data 370 of each fund 330, 340, and 350 can be displayed by clicking on the respective links underneath each respective fund. Example information of the quasi-psychological data 360 and psychological data 370 can include the descriptions in Table 1, below.

In addition, in some example embodiments, the investor 132 can also view his psychological preferences 380 for investing. The psychological preferences 380 may describe how the investor 132 may innately prefer his investments, or the aggregate of all his investments, to behave psychologically, e.g., how do psychological characteristics inform or guide investment decisions of the investment. The investor 132 may learn of his preferences through a series of psychological tests, such as those described in application Ser. No. 14/025,616. The psychological preferences 380 may be viewable by clicking on the link at the bottom of his profile. The investor 132 may desire to assess his portfolio in comparison to his psychological preferences 380. For example, the investor 132 may desire to rebalance his portfolio so that the weighted average of all of his funds matches his psychological preferences. As another example, the investor 132 may want to diversify his portfolio to have varying behavioral characteristics with his psychological preferences 380 at the center.

Figure 4:
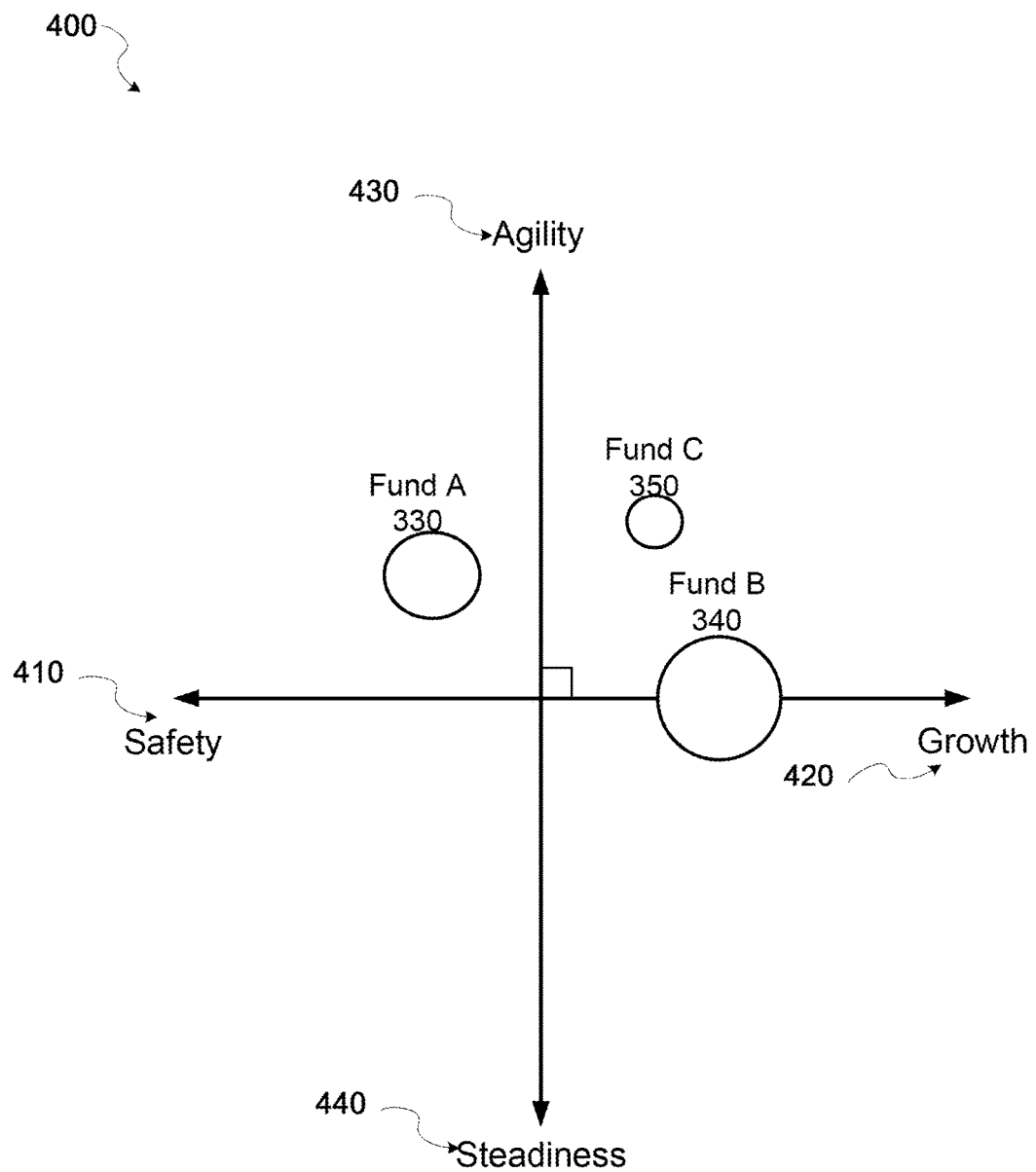
FIG. 4 is an illustration showing an example graph displaying a visual depiction of some behavioral characteristics of the investor's funds, according to some example embodiments.

Referring to FIG. 4, the illustration 400 shows an example graph displaying a visual depiction of some behavioral characteristics of the investor's 132 funds 330, 340, and 350, according to some example embodiments. The investor 132 may desire to see a visual depiction of the behavioral characteristics of his portfolio, as it may make it easier to assess what kind of changes he may wish to make to his portfolio. Here, the funds 330, 340, and 350 are shown as circles of varying sizes in a two-dimensional graph, according to some example embodiments. The size of the circles can represent relative sizes of the funds as a proportion of the investor's 132 portfolio, for example. Thus, referring back to the sizes of the funds 330, 340, and 350 in FIG. 3, fund B 340 is the biggest, while fund C 350 is the smallest, with the circles reflecting these relative relationships among the funds 330, 340, and 350.

The two-dimensional graph of illustration 400 provides two axes representing different dimensions of psychological behavioral characteristics, according to some example embodiments. Here, the horizontal axis represents how growth-oriented a fund is, where a fund displayed more toward the left side of the graph has been assessed as having more "safety" or "maintenance" behaviors 410, meaning the fund is more likely to value not losing value over growing compared to other funds, while a fund displayed more toward the right side of the graph has been assessed as having more "growth" or "accumulation" behaviors 420, meaning the fund is more likely to value growing value at the risk of losing value compared to other funds. A fund being displayed further to either side can mean the fund has a higher degree of that behavior, e.g., exhibiting more growth behaviors if more to the right, exhibiting more safety or maintenance behaviors if more to the left. In addition, the vertical axis represents a degree of movement or volatility of a fund, where a fund displayed more toward the top of the graph has been assessed as exhibiting more "agility" 430, meaning the fund is more likely to behave with more drastic changes in value compared to other funds, while a fund displayed more toward the bottom of the graph has been assessed as exhibiting more "steadiness" 440, meaning the fund is more likely to behave with fewer volatile changes in value compared to other funds. A fund being displayed further to either end can mean the fund has a higher degree of that behavior, e.g., exhibiting more agile behaviors if more to the top, exhibiting more steady behaviors if more to the bottom.

Thus, in this example, the investor's 132 funds each possess slightly different psychological behaviors based on their graphical positions in the illustration 400. For example, fund A 330 is shown to exhibit slightly more safety or maintenance tendencies and slightly more agile tendencies. As another example, fund B 340 is shown to exhibit moderately more growth tendencies and roughly an equal measure of steadiness and agile tendencies. As another example, fund C 350 is shown to exhibit slightly more growth tendencies and moderately more agile tendencies.

In some example embodiments, the dimensions of the horizontal axis can be switched with the vertical axis, while in other cases different dimensions can be displayed. The psychological dimensions shown are merely some examples according to aspects of the present disclosure, and other types of psychological measurements for assessing the behaviors of financial products, apparent to those with skill in the art, may be used, and embodiments are not so limited.

Figure 5A:
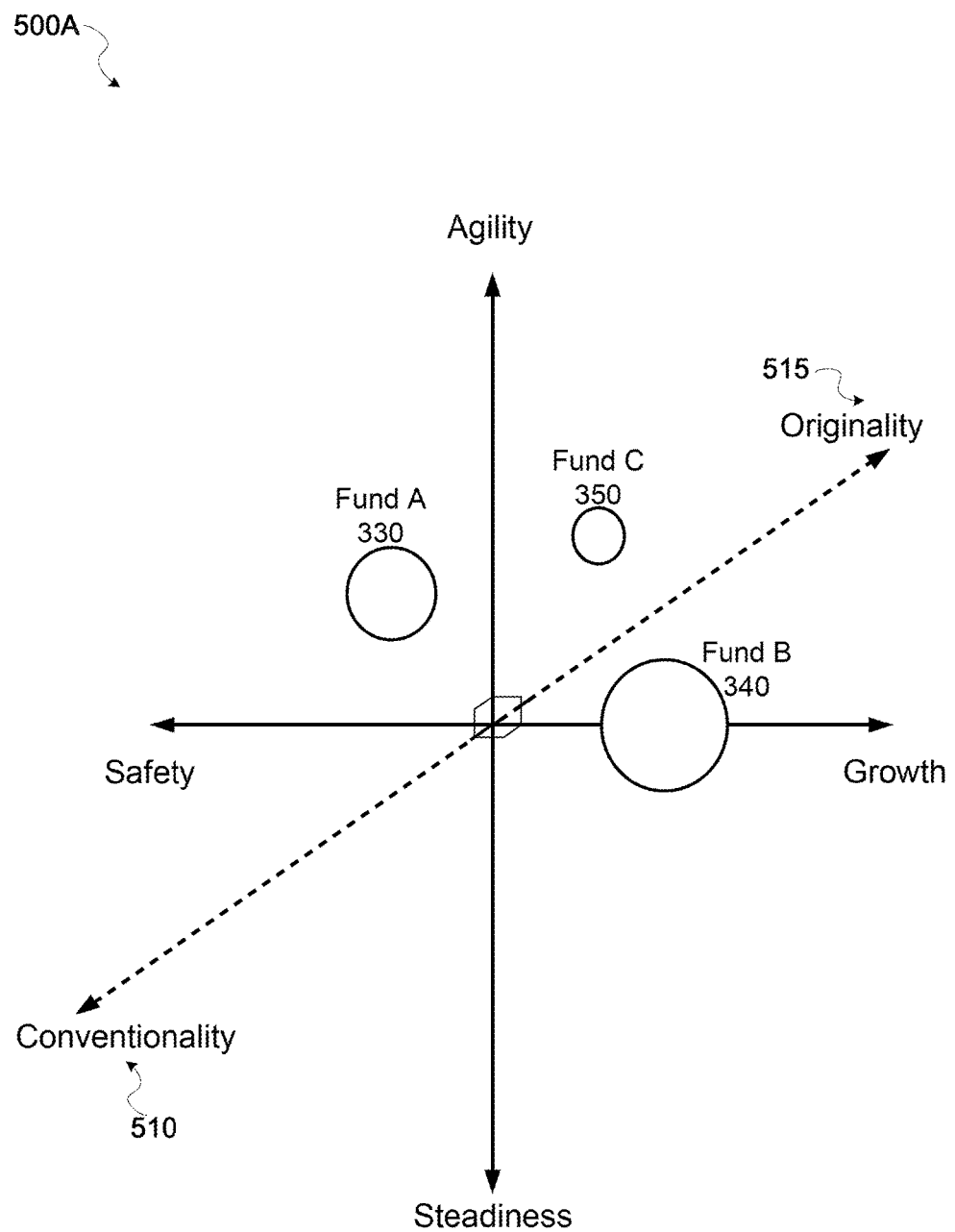
FIG. 5A is an example illustration of a third psychological behavioral dimension that may be included as a third axis in the example graph, according to some example embodiments.

Referring to FIG. 5A, in some example embodiments, a third psychological behavioral dimension may be included as a third axis in the example graph. Illustration 500A shows a third dimension of psychological behavior of investor's 132 funds 330, 340, and 350, represented as a dashed line as shown. The third axis is represented as a dashed line which may traverse a direction contrary to (e.g. orthogonal to) the other existing axes, in this case meaning a direction spanning in and out of the two-dimensional page. Here, this third axis can represent a measure of conventionality of a fund, expressing how similar a fund behaves compared to all other funds. For example, a fund that exhibits behaviors more similar to all other funds may appear more towards the direction of conventionality 510, while a fund that exhibits behaviors that are more atypical of all other funds may appear more towards the direction of originality 515.

Figure 5B:
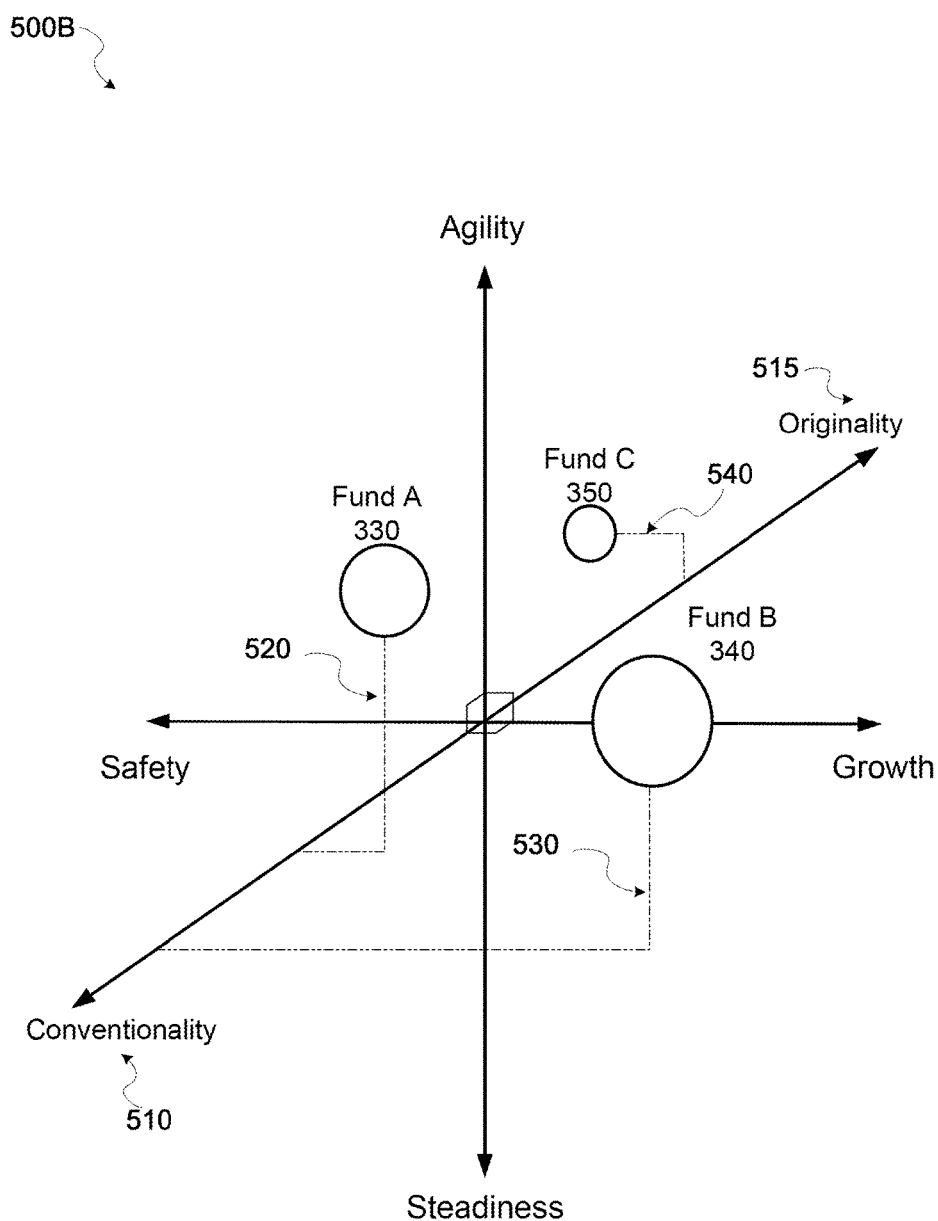
FIG. 5B is an illustration providing an example graphical depiction for mapping each of the investor's funds onto the third behavior dimension, according to some example embodiments.

Referring to FIG. 5B, illustration 500B provides an example graphical depiction for mapping each of the investor's 132 funds 330, 340, and 350 onto the conventionality 510 psychological behavior dimension, according to some example embodiments. The graphical psychological portfolio analysis tool 200, according to some example embodiments, may display only a two-dimensional graph, and therefore mapping the funds 330, 340, and 350 to a third axis may involve additional visual aids, such as reference lines 520, 530, and 540 as shown. Thus, the illustration 500B shows where the funds 330, 340, and 350 are located on the graph having three dimensions of psychological behaviors. In some example embodiments, the graphical psychological portfolio analysis tool 200 can enable the illustration 500B to be clicked and dragged such that the three axes can rotate and move in 2.5 dimensional space (i.e. graphical representation of 3-dimensional space expressed in 2 dimensions), allowing the user 132 to get a better perspective of where each of his funds are mapped into the graph. In some example embodiments, digital displays allowing for 3-D perspectives, such as multilayer three-dimensional screens, can be used in conjunction with the graphical psychological portfolio analysis tool 200 to display a three dimensional graph showing a mapping of the funds for all three dimensions.

Figure 5C:
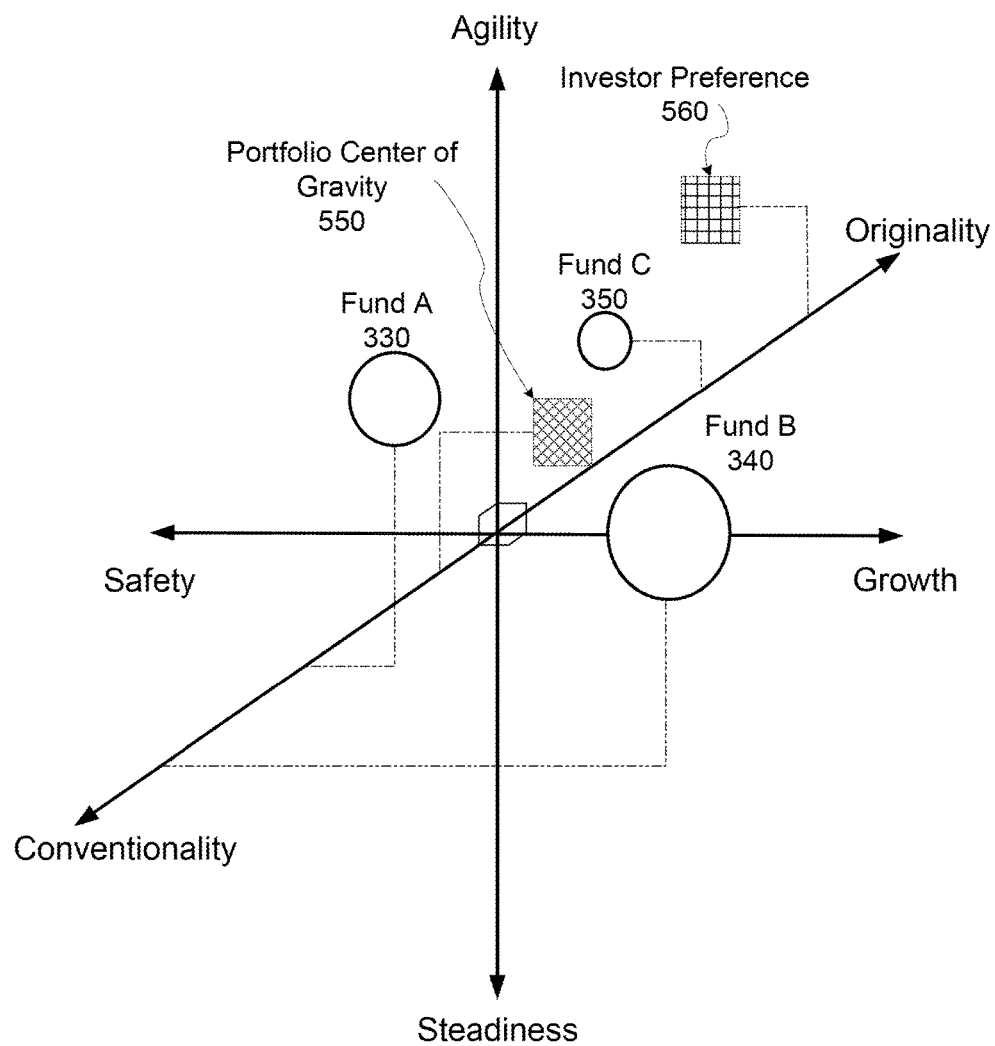
FIG. 5C is an illustration showing additional graphical features displayed by the graphical psychological portfolio analysis tool, according to some example embodiments.

Referring to FIG. 5C, illustration 500C shows additional graphical features displayed by the graphical psychological portfolio analysis tool 200, according to some example embodiments. For example, a portfolio "center of gravity" 550 can be displayed, meaning the point in the graph that represents the middle or average of the portfolio. For example, the center of gravity 550 can show a weighted average in each of the displayed psychological behavior dimensions of all of the funds in the investor's 132 portfolio. The weights can be based on the overall monetary value of each fund, for example. In addition, a display icon showing the investor's 132 investor preference 560 can also be displayed showing the psychological behavior dimensions of the investor's 132 actual preferences. The investor preferences 560 may be consistent with the results shown in the psychological preferences 380 in the investor summary illustration 300 of FIG. 3. The investor preferences 560 may be determined using techniques described in application Ser. No. 14/025,616, for example. Displaying these additional graphical features can allow the investor 132 to view how his preferences align with the psychological behaviors of his portfolio, both in a general sense (e.g., via the center of gravity 550) as well as in specific instances (e.g., via the individual funds 330, 340, and 350).

Figure 6A:
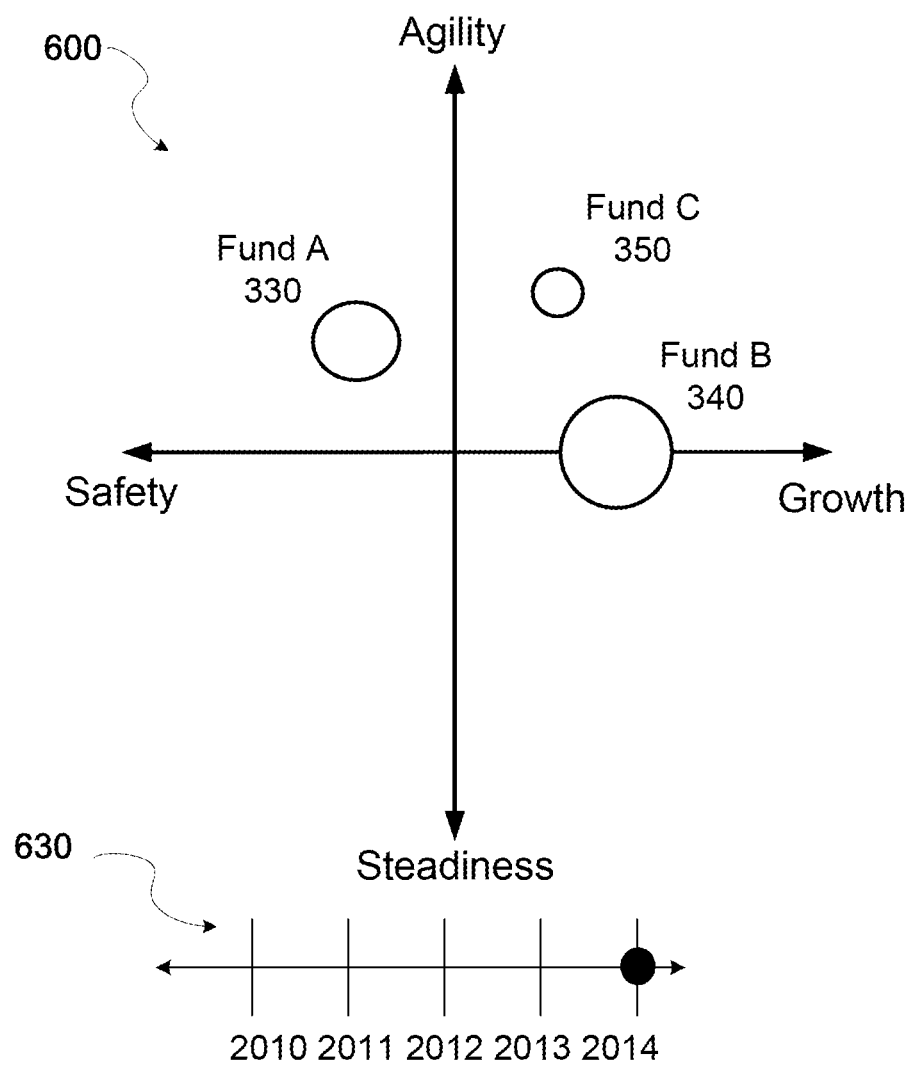
FIGS. 6A, 6B and 6C show illustrations of the graphical psychological analysis tool including a temporal dimension illustrating psychological characteristics of funds across different years, according to some example embodiments.
Figure 6B:
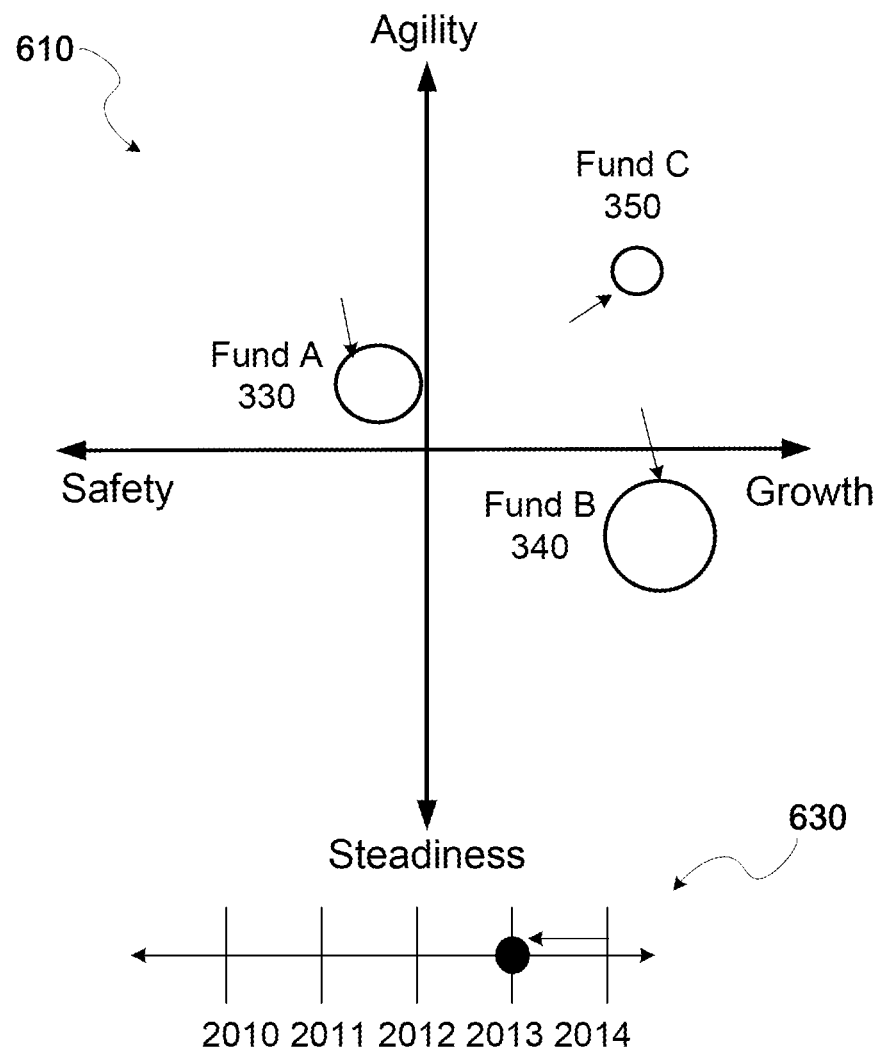
Figure 6C:
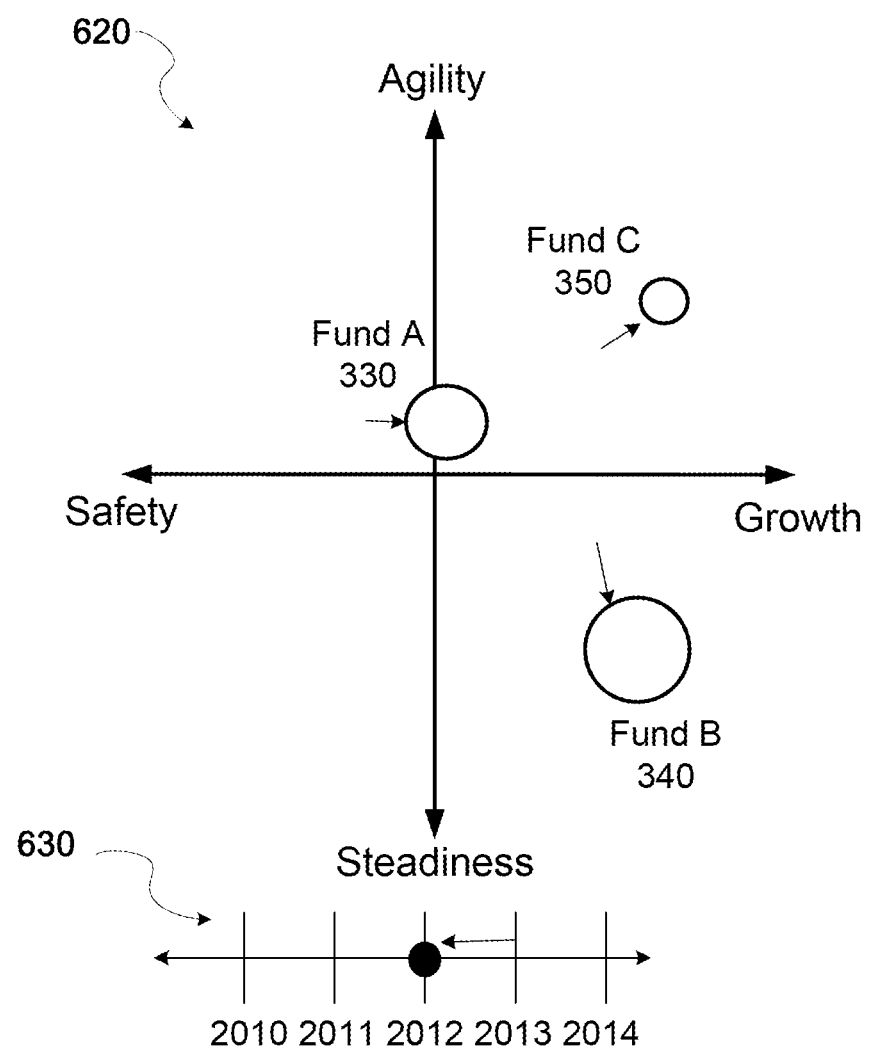

Referring to FIGS. 6A, 6B, and 6C, the graphical psychological portfolio analysis tool 200, according to some example embodiments, can also include a temporal dimension illustrating psychological characteristics, e.g., psychological data, quasi-psychological data, of funds across different years. FIGS. 6A, 6B, and 6C show a series of illustrations displaying an example for how the temporal dimension may be expressed, according to some example embodiments. For example, a scrollbar 630 can be included in the graphical psychological portfolio analysis tool 200 to allow an investor 132 to view psychological behaviors of his funds or of his portfolio overall across different years. The investor 132 can click and drag the circle over the year 2014 in the scrollbar 630 and slide it to other years in the scrollbar 630. In other cases, the investor 132 can click a location on the scrollbar 630, and the graphical psychological portfolio analysis tool 200 can respond with displaying the fund's behavioral characteristics at the time period that the investor 132 has clicked.

Referring to FIG. 6A, for example, the graph in illustration 600 shows the psychological behavior characteristics of the funds 330, 340, and 350 for the year 2014, according to the scrollbar 630 in illustration 600. Referring to FIG. 6B, as another example, the graph in illustration 610 shows the psychological behavior characteristics of the funds 330, 340, and 350 for the year 2013, according to the scrollbar 630 in illustration 610. In addition, in some example embodiments, arrows or vectors can be included showing direction in the change of psychological behavior of the funds. In other cases, an animation may be displayed in the graph showing the funds 330, 340, or 350 moving as the time period in the scrollbar 630 is moved. Referring to FIG. 6C, similarly, the graph in illustration 620 shows the psychological behavior characteristics of the funds 330, 340, and 350 for the year 2012, according to the scrollbar 630 in illustration 620. In some example embodiments, more arrows or vectors may be provided showing direction in the change of psychological behavior of the funds.

While the graphs in FIGS. 6A, 6B, and 6C show only two dimensions of psychological behavior, in some example embodiments, additional psychological behaviors. e.g., a measure of conventionality 510, can be displayed along with the scrollbar 630, and embodiments are not so limited.

Figure 7:
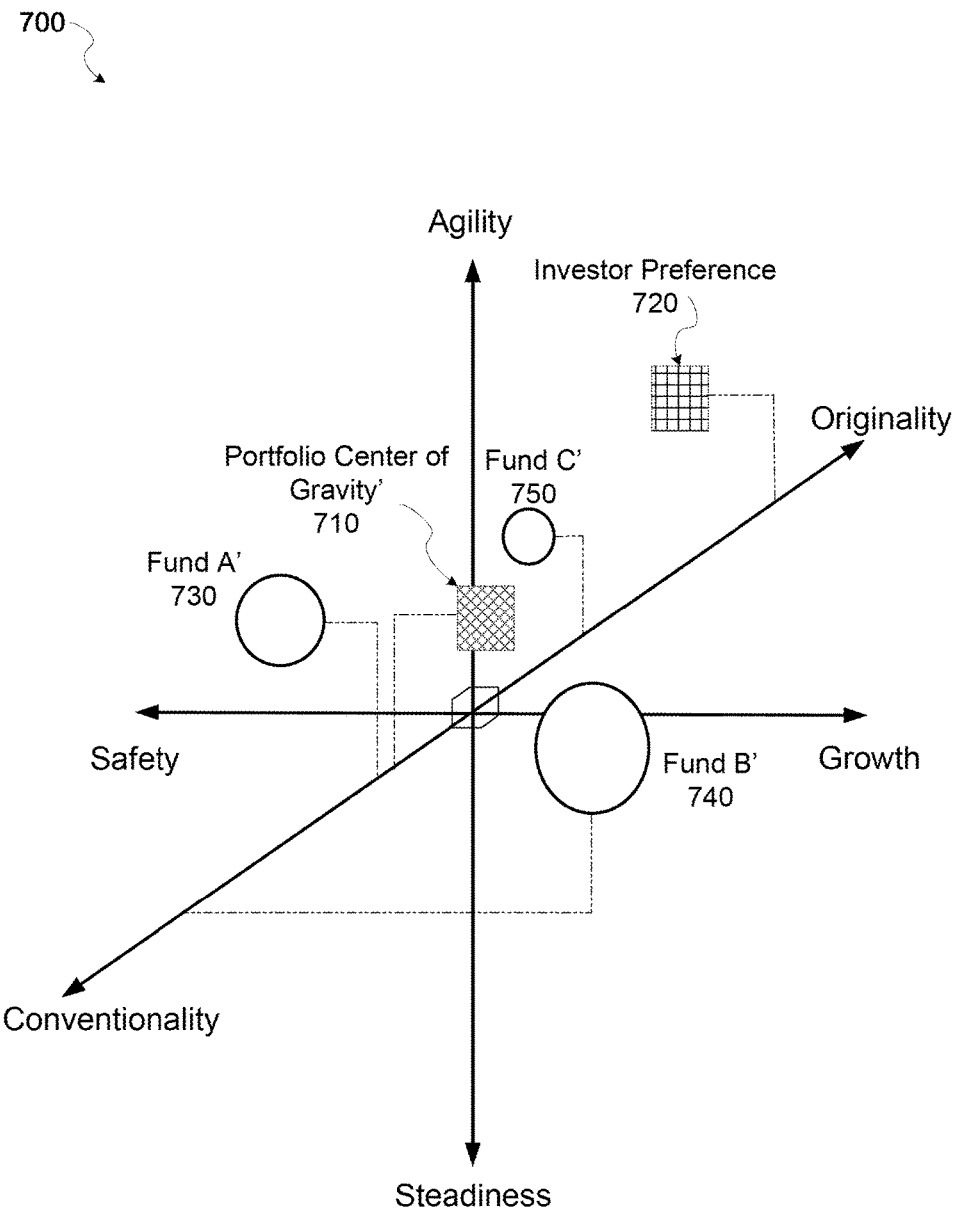
FIG. 7 is an illustration showing another graph of psychological behavior characteristics of the investor's funds using psychological data as opposed to the quasi-psychological data, according to some example embodiments.

Referring to FIG. 7, illustration 700 shows another graph of psychological behavior characteristics of the funds 330, 340, and 350, using psychological data as opposed to the quasi-psychological data, according to some example embodiments. The data used to generate this graph may be based on the psychological data 370 provided in the portfolio summary of illustration 300. Here, while the three dimensions may be the same, the positions of at least some of the objects in the graph, e.g., the funds A' 730, B' 740, and C' 750, and the center of gravity' 710 may be different due to being based on the psychological data as opposed to the quasi-psychological data. However, in some cases, the investor preference 720 may be in the same position as investor preference 560, because the underlying data may be the same, e.g., generated based on the psychological profile discussed in application Ser. No. 14/025,616.

Figure 8:
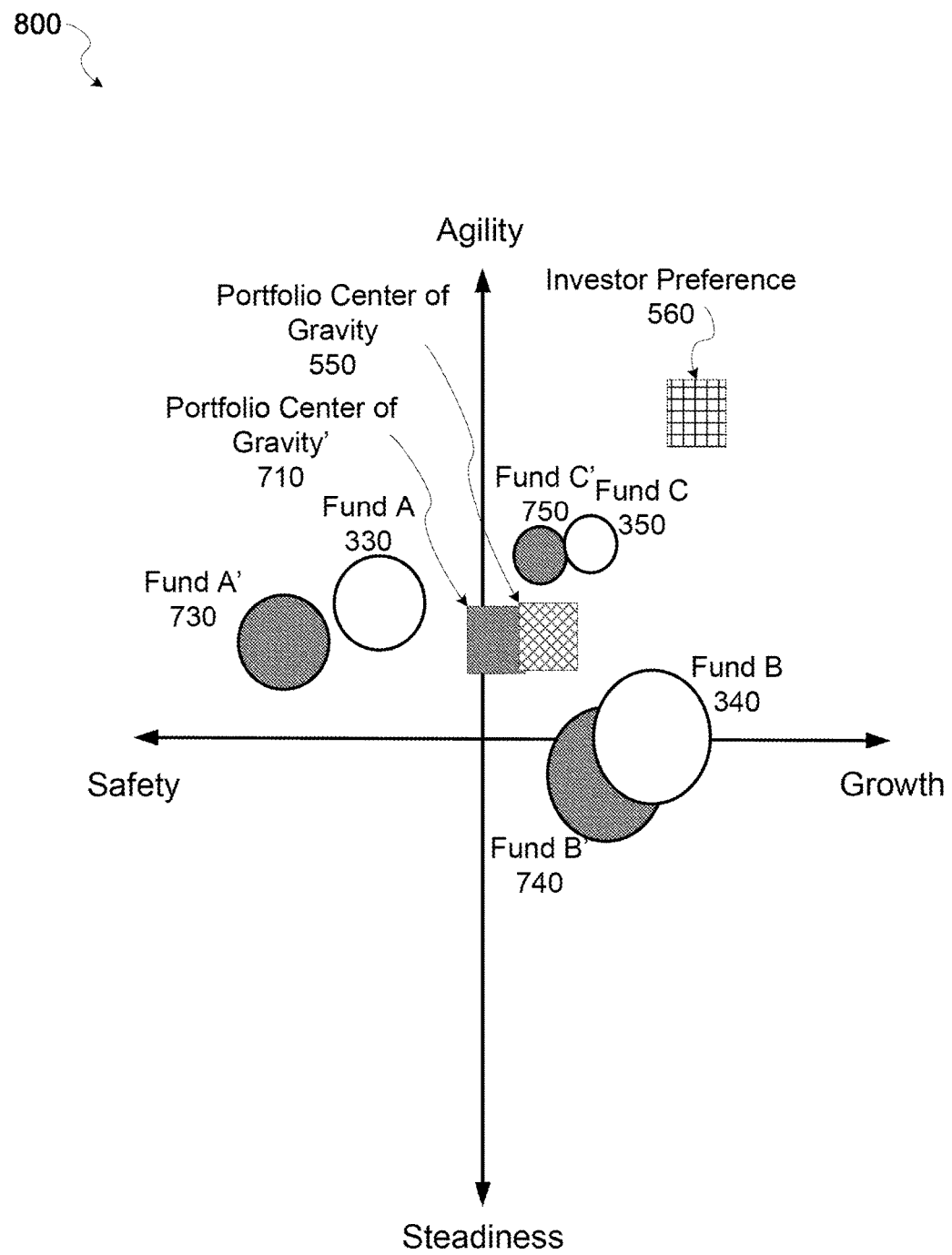
FIG. 8 is an illustration showing another graph of psychological behavior characteristics of the investor's funds, according to some example embodiments

Referring to FIG. 8, illustration 800 shows another graph of psychological behavior characteristics of the investor's 132 funds, according to some example embodiments. In this case, the graph of illustration 800 shows a superposition of the psychological behavior characteristics using both the psychological data and the quasi-psychological data. The shaded objects show the positions of the funds using the psychological data, while the unshaded objects show the positions of the funds using the quasi-psychological data. Displaying a superposition of the funds using both the psychological data and the quasi-psychological data can allow the investor 132 to see how aligned a fund's observable behavior (e.g., based on the objectively observable outcomes provided by the quasi-psychological information) is with the underlying psychological characteristics (e.g., based on the psychological data).

In some example embodiments, other graphics can be displayed based on a combination of the psychological data and the quasi-psychological data. For example, a weighted average of the positions from both the psychological data and the quasi-psychological data can be displayed. As another example, animations showing movements between the positions based on the psychological data to the quasi-psychological data can be displayed. As another example, calculations or metrics illustrating the distance or difference between the two sets of data for a particular fund can also be displayed. These calculated differences can help the investor 132 to see how large a deviation some of the funds are between their observable behavior and their underlying psychological characteristics.

In some example embodiments, additional psychological dimensions can be displayed or conveyed using the graphical psychological portfolio analysis tool 200. These additional dimensions can be substitutes on any of the axes for any of the example dimensions described herein. For example, a measurement describing how frequently trades are made within the fund can be included. Examples of other psychological dimensions can include: 1) Adaptability versus Competitiveness, which can describe a measure of changing directions in adverse markets versus trying to beat the competition in the same market; 2) Predictability versus Independence, which can describe how predictable returns of the fund are based on previous returns; 3) Openness versus Discreteness, which can describe how transparent a fund is, based on an amount of disclosed information (e.g., number of words in fund website, amount of disclosed performance data, etc.); 4) Promotion/Prevention orientation, which can describe how focused the fund managers are toward risk-management versus executing successful strategies (e.g., could be described as "playing to win" versus "playing not to lose"); and 5) Collectivism versus Individualism, which can describe to what degree the fund favors collective thought versus individualistic thought when making decisions. In some example embodiments, the Adaptability versus Competitiveness can be analogous in quasi-psychological data to examining whether periods of loss are short lived (e.g., short drawdown period) indicating the manager can adapt to adverse market conditions, and whether there is a history of "beating the market" (e.g., high and consistent "alpha" relative to benchmark). In some example embodiments, the Predictability versus Independence dimension can be analogous in quasi-psychological data to examining for a high number of % positive months (e.g., consistently positive returns), stable beta relative to benchmark, high auto-correlation of returns (e.g., persistent patterns in returns) and whether there are an independent of the amount of returns.

In some example embodiments, the graphical psychological portfolio analysis tool 200, according to aspects of the present disclosure, can be configured to provide an optimization feature for providing suggestions or recommendations for re-balancing the investor's 132 portfolio. The re-balancing can be based on the investor 132's investment preference 560, such that the center of gravity 550 of the portfolio better aligns with the investment preference 560. The graphical psychological portfolio analysis tool 200 can provide a visual depiction of this re-balancing, for example showing the current configuration (e.g., FIG. 5C or FIG. 7) and showing a recommended re-balancing configuration of the funds superimposed on the same graph.

In some example embodiments, the graphical psychological portfolio analysis tool 200, according to aspects of the present disclosure, can be configured to show how one or more investors' psychological preferences compare to one or more fund managers' psychological preferences. In some example embodiments, this comparison may be illustrated from the one or more fund managers' perspectives. That is, just as how an investor can see his preferences and how they compare to his funds, so too can one or more managers of a fund see how his own preferences compare to the preferences of investors whose money he is managing.

For example, the tool 200 may display a box for a manager's preferences, similar to the investor preference icon 560 but based on a manager's preferences instead. In addition, instead of various circles in the graph showing positions and sizes of the funds, the positions of various circles or other shapes in the graph may represent different investors' psychological preferences, while the sizes of the various circles or other shapes may represent their percentage of the fund's overall assets under management held by each investor.

In some example embodiments, the tool 200 can also allow for investors to be identifiable or anonymous. For privacy or to increase objectivity or other reasons, it may be desirable for at least some investors to not be identified on the graph. As such, the tool 200 can be configured to toggle identification of the investors. In some cases, the tool 200 can allow the individual investor to toggle the setting. If an investor chooses to be visible or identifiable, his or her individual position in the graph can be seen by the fund managers of the fund, and her or his percentage size of the overall assets under management may be reflected proportionately by the size of the circle or other shape. If an investor chooses anonymity, his or her position may not been seen by the fund. In this case, all anonymous investors may be aggregated together to form a single position and size in the graph, corresponding to the aggregate position of all the anonymous investors and an aggregate size corresponding to the sum total percentage of assets under management of all anonymous investors. In other cases, each individual anonymous investor's positions and size may be displayed in the graph, but their names may be obscured or made anonymous, e.g., "John Doe 1," "Jane Doe 2," "Anon 1." "Anon 2," etc.

In some example embodiments, the example psychological dimensions in the example graphs are based on the following psychological and quasi-psychological data 360 of a fund, as shown in the example Table 1:

TABLE 1

| Dimension | Psychological Data Obtained in Psychological Profile* | Quasi-Psychological Data Obtained in Objective Data of Fund |
|---|---|---|
| 1. Growth/ Accumulation vs. Maintenance/ Safety | Rate the way the manager manages the fund: Offensive-defensive Risk taking-risk avoiding Bold-cautious Aggressive-moderate Expansion-preservation Attack-protection | %-ile rank of kurtosis. The highest positive rank kurtosis would be the highest ranking on growth/accumulation. |
| 2. Agility vs. Steadiness | Rate the way the manager manages the fund: Variable-steady Movement-stability Agile-calm Active-passive Changing-constant Sprint-marathon Fast-slow Short-Term Profit-long-term profit | %-ile rank of "standard deviation of rolling standard deviation." The highest positive rank of this quantity (most variability in variability) would be the highest ranking on agility. |
| 3. Conventionality vs. Originality | Rate the way the manager manages the fund: Innovation-tradition Novel-established Explorative-confirmative Craft-Art Conventional-Original Realistic-Imaginative | Average the %-ile rank on two measures, and re-rank (percentilize) the average. The two measures are: 1. Corrrelation of fund returns to HFRI Fund Weighted Composite Index returns (or some other representative fund index) 2. AUM The highest percentile rank AUM funds should be associated with the "conventional" end of the scale, while the most negative correlated and smallest AUM should be on the "original" end. |

The following are example methods for generating the positions or values of each psychological dimension of any particular fund. One example method is based on using quasi psychological data, while a second example method is based on using psychological data, described more below.

Quasi Psychological Data

To generate values of the psychological dimensions using quasi-psychological data, in some example embodiments, the following sets of data may be used:

1. The historical performance returns for each month for the fund, expressed in percent. For example, the monthly return for a fund could be +1.67%, −0.89%, etc. Historical records can encompass years, and are termed "time series."

2. Another time series history is the monthly history of assets under management (AUM) for each fund, expressed in currency. The most recent AUM number may be used as a measure of the size of the fund.

3. An index representing the fund "market." An example is the "HFRI Fund Weighted Composite Index," discussed in Table 1, which is a commonly-used aggregate measure of fund performance. Alternatively, any fund index can be used which is representative, in the same way that the S&P500 Index or Dow Jones 30 Index is often thought to be representative of the US stock market. The HFRI index incorporates ~2000 HFs, and reports the aggregated returns monthly, so it is on the same time frequency as the monthly time series of hedge fund returns.

Based on these data sets or other similar data sets known to those with skill in the art, example methods for generating value of the psychological dimensions using quasi-psychological data are as follows:

"Percentile rank of kurtosis" (see Table 1)
  a. Calculate the kurtosis of monthly returns history of each fund in the database
  b. Calculate the percentile rank of each fund kurtosis. High kurtosis means an above average frequency of relatively high and low returns—and is interpreted as evidence the fund is seeking risk in an effort to gain capital growth. Sometimes the strategy works (high gain) and sometimes it fails (high loss). A relatively high positive kurtosis will translate to a high percentile rank, and will be associated with seeking growth and accumulation.

"Percentile rank of 'standard deviation of rolling standard deviation'" (see Table 1)
  a. Calculate the rolling standard deviation of time series of monthly returns, for example computing the standard deviation of the previous 24-months of history, sliding over a 60-month history, will result in 36 standard deviation numbers.
  b. Then compute the standard deviation of this distribution of 36 numbers. This is the "Standard deviation of rolling standard deviation."
  c. Since standard deviation is a measure of how much the returns vary from month-to-month, the standard deviation of the rolling standard deviation is a measure of how stable or repeatable is the variation. Funds with relatively high "standard deviation of rolling standard deviation" will be "agile," and conversely, ones with low measures will be "steady."

The third measure is an average of 1) the percentile rank of correlation of fund returns to a fund index, such as the HFRI Index and 2) percentile rank of most recent AUM. This corresponds to the notion that "conventional" hedge funds are defined by having returns similar to the other funds, and have large assets under management.

Psychological Data

To generate values of the psychological dimensions using psychological data, in some example embodiments, the psychological profile items in the psychological data column of Table 1 are rated on polarity scales by the investor 132 or the fund manager (depending on the context), e.g.:

Rate the way the manager manages the fund:
1=highly offensive 2 3 4 5 6=highly defensive Here, the psychological profile item contrasts "offensive" versus "defensive" characteristics of the way the manager manages the fund. In some example embodiments, multiple psychological items are assessed using the same scale, e.g., from 1 to 6. Examples can include Bold vs. Cautious. Individualistic vs. Team Oriented, Innovation vs. Tradition, Protection vs. Attack, Changing vs. Constant, and many others apparent to those with skill in the art. For example, there may be up to 45 pairs of the psychological profile items used for assessing behavior preferences of the investor or fund manager.

Based on each rating, e.g., scale of 1 to 6, a raw value is assigned to each item in the pair of psychological profile items. For example, if in the above example the manager is rated as a "5," then the "defensive" item is assigned a value of 5, while the "offensive" item is assigned a value of 2, e.g., the difference between the total value (i.e., 7) and selected value (i.e., 5). This process continues for each of the psychological profile items.

In some example embodiments, other methods for ratings psychological profile items may be used. For example, a Likert-type scale may be used, where the psychological profile items include Likert items. Other types of methods may be used that are apparent to those with skill in the art, and embodiments are not so limited.

In some example embodiments, these psychological profile items may be pre-designated to contribute toward one or more of the psychological dimensions described herein, e.g., growth/accumulation, maintenance, agility, etc. For example, the item "offensive" may contribute toward a larger score in the growth/accumulation dimension, while the item "defensive" may contribute toward a larger score in the maintenance/safety dimension. Thus, the growth/accumulation dimension may increase by 5 based on the above example, while the maintenance/safety dimension may increase by 2. As another example, the item "innovation" may contribute toward a larger score in the originality dimension, while the item "tradition" may contribute toward a larger score in the conventionality dimension. As another example, the item "changing" may contribute toward a larger score in the agility dimension, while the item "constant" may contribute toward a larger score in the originality dimension. This process may continue for all psychological profile items pre-designated to contribute to an overall score for each of the psychological dimensions. In some example embodiments, the aggregate score for each psychological dimension forms a dimension score for that particular psychological dimension. In other cases, the aggregate score is averaged (e.g., mathematical mean) based on the number of items contributing to the score to produce the dimension score. For example, to determine the Growth/Maintenance dimension score, the average of six items (e.g., offensive-defensive, risk taking-risk avoiding . . . ) is calculated.

In some example embodiments, to determine how these dimension scores are placed on the graph, all known funds are first ordered from low to high (e.g., based on their dimension scores) along each of the quasi-psychological or psychological dimensions (e.g., safety vs. growth, agility vs. steadiness, conventionality 510 vs. originality) and the position of the fund in question along each dimension is determined based on its percentile score on this continuum. The resulting percentile scores (for each dimension) are used to show the fund's location in the graph. In some example embodiments, before this is done, the percentile scales (e.g., ranging from 1-100) and the psychological scales (e.g., a scale of profile answers ranging from 1-6) are normalized to make quasi-psychological and psychological information comparable. Thus, for example, a fund placed equally between both ends of the safety vs. growth axis has been scored as being the $50^{th}$ percentile on the continuum of safety vs. growth compared to all other funds that have been scored.

In some example embodiments, the position of the investor preference 560) in the graphs can be obtained by the investor 132 providing ratings to the psychological items in the psychological data column of Table 1 and the related descriptions above, with the questions directed to the investor 132 instead of the manager of the fund, e.g., "Rate the way you (referring to the investor 132) prefer investing."

In some example embodiments, the graphical displays mentioned herein can be manipulated by the investor 132 via other means, including using touch data (e.g., on a touchpad), voice data (e.g., using voice recognition software), and other means.

In some example embodiments, the tool 200 may generate the objects to view in the graph as follows. The user 132 can select if a 3-dimensional or 2-dimensional graph is shown. For example, the user interface module 202 may display an option for the user 132 to select either a 3-dimensional or 2-dimensional graph. If a 3-dimensional graph is selected, three dimensions (e.g., safety/maintenance vs. growth/accumulation, agility vs. steadiness, conventionality vs originality) are displayed in a fixed, pre-defined order, for example as shown in FIGS. 5A-5C. In the 2-dimensional graph version, the user 132 may select which dimension out of the three dimensions is shown on the x-axis, and which dimension is shown on the y-axis. In some example embodiments, the display of the range of each axis is fixed, e.g. ranging from 1-100, with 50 being in the center where the axes meet. These numbers represent the percentile rank of the funds when their statistical/financial data are used to determine their location. When answers from the psychological assessments are used (e.g., these answers are given on Likert-scales from 1-6), the dimension scores from the Likert scales (e.g., ranging from 1-6) may be normalized to percentile scales (e.g., 1-100).

Figure 9A:
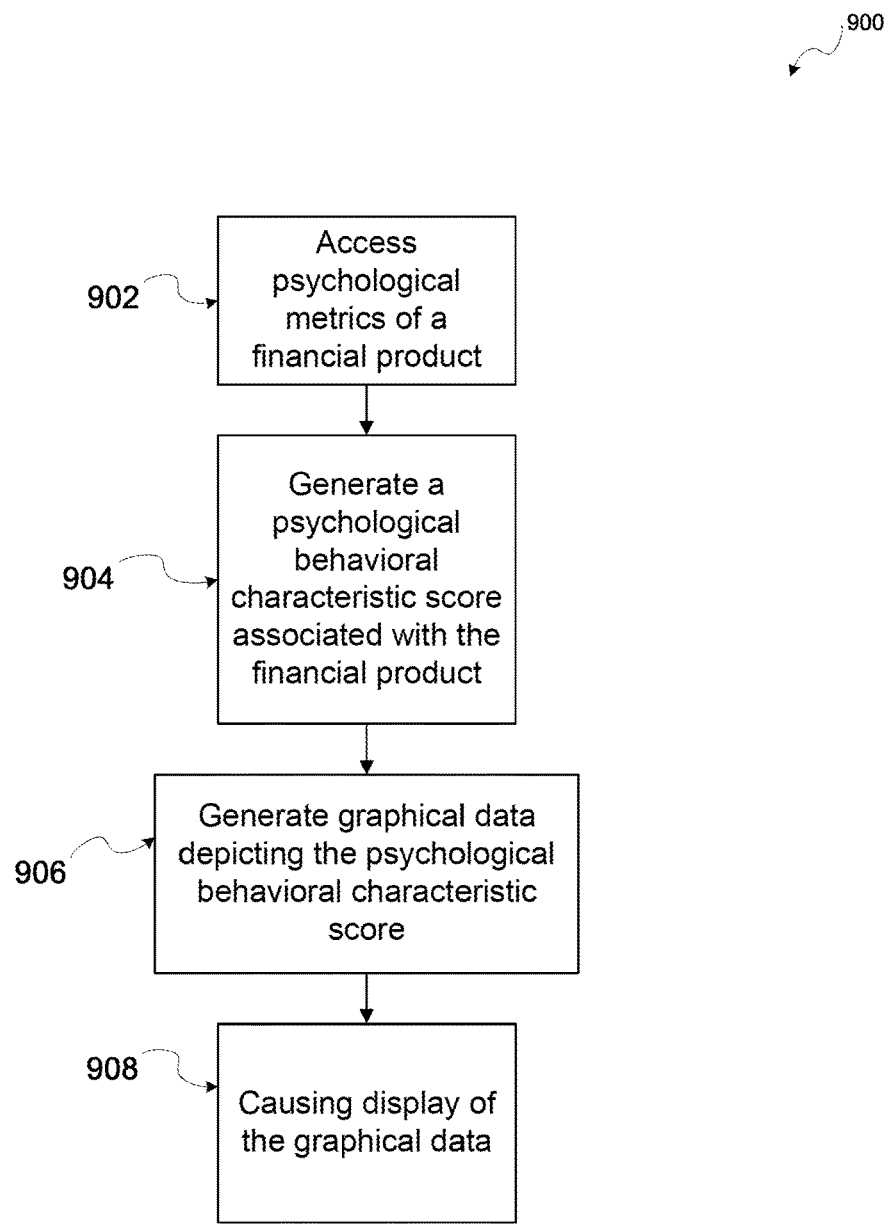
FIG. 9A is a flowchart illustrating an example methodology for providing a psychological analysis of financial products in the investor's financial portfolio, according to some example embodiments.

Referring to FIG. 9A, the flowchart illustrates an example methodology 900 for providing a psychological analysis of financial products in an investor 132's financial portfolio, according to aspects of the present disclosure. The psychological analysis of a financial product may describe the decision-making behaviors or tendencies used to drive investment decisions of the financial product, where performance outcomes of the financial product are the result of those investment decisions. The example methodology may be consistent with the methods described herein, including, for example, the descriptions in FIGS. 1-8, and may be directed from the perspective of a network-based system (e.g., network-based system 105) configured to access psychological data of an investor 132's financial portfolio and to display a graphical psychological analysis based on that psychological data. In some example embodiments, the methodology 900 may be performed by the psychological portfolio analysis tool 200 described in FIG. 2.

At operation 902, the network-based system 105 may access psychometric data of a financial product. Examples of the financial product can include can include a hedge fund, bond, stock, mutual fund, insurance policy, and the like, including for example, funds 330, 340, and 250, as described in FIG. 3. Examples of psychometric data can include any of the descriptions of psychometric data described herein, including the quasi-psychological data 360 and the psychological data 370 as described in FIG. 3, and in general may be data that describes how decisions are made with respect to the financial product, rather than describing the financial product by its financial outcomes. The financial product may include financial capital from an investor 132 who may be accessing the networked-based system 105 to analyze and monitor a financial portfolio that includes the financial product. In some example embodiments, the network-based system 105 may access the psychometric data from the database 115. In some example embodiments, the psychological portfolio analysis tool 200 may perform the operation 902 by accessing the psychometric data through data access module 204.

The network-based system 105 may generate a psychological behavioral characteristic score associated with the financial product in operation 904. Generating the psychological behavioral characteristic score may be based on the psychometric data accessed in operation 902. Examples of a psychological behavioral characteristic can be any of the three behavioral dimensions described in any of FIGS. 4-8, such as safety vs. growth, agility vs. steadiness, and conventionality 510 vs. originality. A psychological behavioral characteristic score therefore may be a quantitative value about the financial product indicating a measure or degree along the associated behavioral dimension. In some example embodiments, the psychological behavioral characteristic score can be represented as a percentile compared to all other or at least a group of other financial products. Examples for generating the score based on the psychological data may include the methods described above with respect to the example data in Table 1. The flowchart in FIG. 9B, below, shows further details for generating the psychological scores, according to some example embodiments. In some example embodiments, the psychological portfolio analysis tool 200 may perform the operation 904 by generating the psychological behavioral characteristic score through product analysis module 208.

At operation 906, the network-based system 105 may then generate graphical data for a graphical display, based on the first psychological behavioral characteristic score. The graphical data may include a first behavioral dimension for visually depicting a graphical representation of the first psychological behavioral characteristic score. In some example embodiments, the psychological portfolio analysis tool 200 may perform the operation 906 by generating the graphical data through product analysis module 208. In other cases, the user interface module 202 may be configured to perform operation 906. At operation 908, the networked-based system 105 may then cause display of the graphical data. Examples of this display can include any of the example graphs described herein, including the graphs in FIGS. 4-8. For example, the psychological behavioral characteristic score may be represented as a circle or a square positioned along a behavioral dimension, the position of the circle or square along the behavioral dimension being in accordance to the score. In some example embodiments, multiple psychological behavioral characteristic scores can be generated, each score corresponding to a different behavioral dimension. In addition, each of the scores can be displayed in a graph, where the graph may be configured to display a single position of the financial product based on the scores of the multiple behavioral dimensions (e.g., a two-dimensional graph, or three-dimensional graph). In some example embodiments, operation 908 may be performed by the user interface module 202.

In general, while the methodology 900 discusses generating a single financial product having a single score and displaying the score in a single graph, as shown in the previous examples, multiple financial products having multiple scores can be displayed in multiple graphs, and embodiments are not so limited. For example, multiple psychological behavioral characteristic scores associated with a single financial product can be based on both quasi-psychological data and psychological data.

Figure 9B:
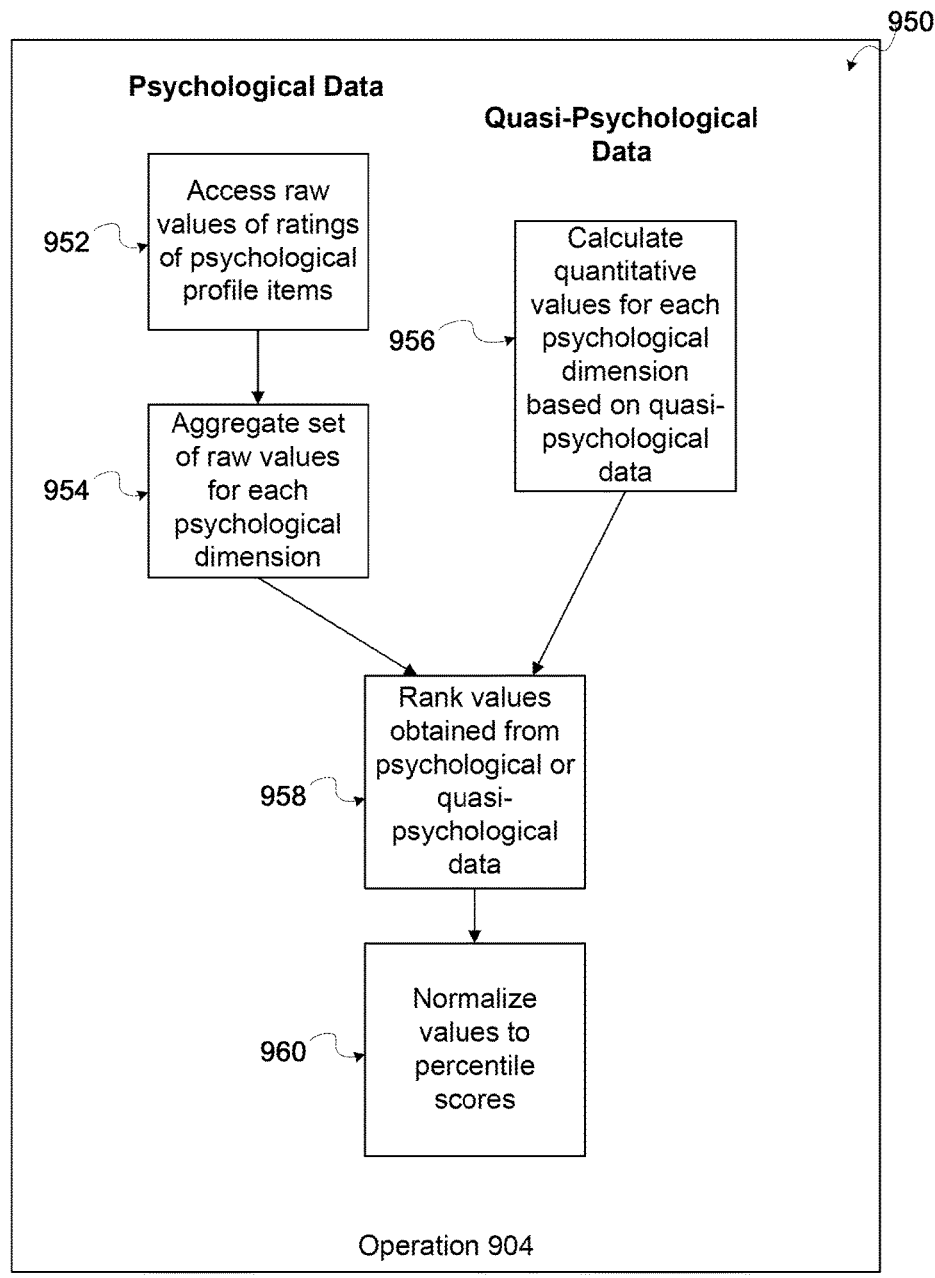
FIG. 9B is flowchart illustrating an example methodology of further details for generating a psychological behavioral characteristics score associated with the financial product, according to some example embodiments.

Referring to FIG. 9B, the flowchart illustrates an example methodology 950 of further details for performing operation 904, that is, generating a psychological behavioral characteristics score associated with the financial product, according to aspects of the present disclosure. The example methodology may be consistent with the methods described herein, including, for example, the descriptions in FIGS. 1-8, and may be directed from the perspective of a network-based system (e.g., network-based system 105) configured to access psychological data of an investor 132's financial portfolio. Example methodology 950 may start from one of two branches, based on either if the psychometric data includes psychological data or quasi-psychological data.

From the branch including psychological data, at operation 952, the network-based system 105 may access raw values of ratings of psychological profile items. Examples of psychological profile items include the items in the descriptions of Table 1 and related paragraphs below Table 1, such as Bold vs. Cautious, Individualistic vs. Team Oriented. Innovation vs. Tradition, Protection vs. Attack, and Changing vs. Constant. The raw values may be the assessment scores rating how strongly the investor 132 or the fund manager is associated with one item or the other in each pair of the psychological profile items. In some cases, the tool 200 can facilitate this assessment to generate the raw values, while in other cases, the raw values may be generated previously through other means, such as through the tool described in application Ser. No. 14/025,616. In some example embodiments, the branch including psychological data may be performed by the psychological data analysis module 212.

At operation 954, the raw values may then be summed, combined, or generally aggregated, the aggregation or grouping based on how each psychological profile item corresponds to a psychological dimension, e.g., growth, safety, agility, steadiness, etc. In some cases, each of the pair of items in the psychological profile item (e.g. offensive and defensive, bold and cautious, etc.) has been pre-designated to correspond to a particular psychological dimension. The raw values may then be summed, combined, or generally aggregated to form an overall score for each psychological dimension. This process may be repeated for each psychological dimension of a fund, and for every fund in the database.

From the branch including quasi-psychological data, at operation 956, the network-based system 105 may calculate quantitative values for each psychological dimension based on quasi-psychological data corresponding to each psychological dimension. Examples of what quasi-psychological data correspond to what psychological dimension may include the descriptions in Table 1. For example, a measure of kurtosis of each fund's returns data may be used to assess the fund's degree of growth versus safety. The example descriptions below Table 1 describe further example details for calculating quantitative values for each psychological dimension based on quasi-psychological data. In some example embodiments, these quantitative values may already be calculated, and so the network-based system 105 may simply access these values from a stored source, such as database 115. In some example embodiments, the branch including quasi-psychological data may be performed by the quasi-psychological data analysis module 210.

Once the values from the psychological data or the quasi-psychological data have been generated or obtained, at operation 958, the values of all of the funds for each psychological dimension are ranked in comparison to each fund. Then, at operation 960, the ranked values may be normalized to produce percentile scores or rankings for each fund, for each psychological dimension. These percentile scores for each psychological dimension may then be used to determine the positions of each of the funds in the graph, at operation 906.

Figure 10:
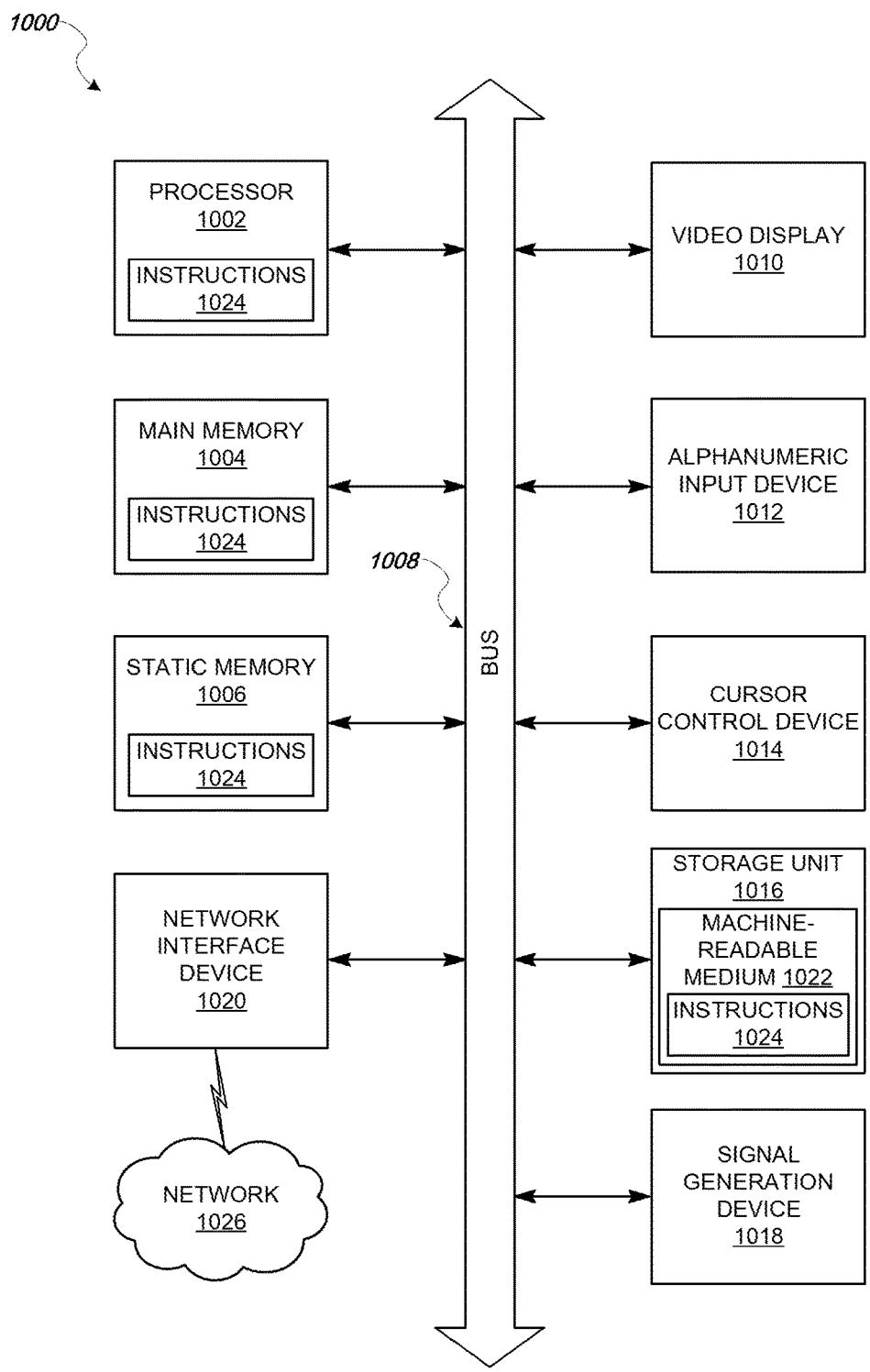
FIG. 10 is a block diagram illustrating components of a machine, according to some example embodiments, able to read instructions from a machine-readable medium and perform any one or more of the methodologies discussed herein.

Referring to FIG. 10, the block diagram illustrates components of a machine 1000, according to some example embodiments, able to read instructions 1024 from a machine-readable medium 1022 (e.g., a non-transitory machine-readable medium, a machine-readable storage medium, a computer-readable storage medium, or any suitable combination thereof) and perform any one or more of the methodologies discussed herein, in whole or in part. Specifically, FIG. 10 shows the machine 1000 in the example form of a computer system (e.g., a computer) within which the instructions 1024 (e.g., software, a program, an application, an applet, an app, or other executable code) for causing the machine 1000 to perform any one or more of the methodologies discussed herein may be executed, in whole or in part.

In alternative embodiments, the machine 1000 operates as a standalone device or may be connected (e.g., networked) to other machines. In a networked deployment, the machine 1000 may operate in the capacity of a server machine 110 or a client machine in a server-client network environment, or as a peer machine in a distributed (e.g., peer-to-peer) network environment. The machine 1000 may include hardware, software, or combinations thereof, and may, as example, be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 1024, sequentially or otherwise, that specify actions to be taken by that machine. Further, while only a single machine 1000 is illustrated, the term "machine" shall also be taken to include any collection of machines that individually or jointly execute the instructions 1024 to perform all or part of any one or more of the methodologies discussed herein.

The machine 1000 includes a processor 1002 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1004, and a static memory 1006, which are configured to communicate with each other via a bus 1008. The processor 1002 may contain microcircuits that are configurable, temporarily or permanently, by some or all of the instructions 1024 such that the processor 1002 is configurable to perform any one or more of the methodologies described herein, in whole or in part. For example, a set of one or more microcircuits of the processor 1002 may be configurable to execute one or more modules (e.g., software modules) described herein.

The machine 1000 may further include a video display 1010 (e.g., a plasma display panel (PDP), a light emitting diode (LED) display, a liquid crystal display (LCD), a projector, a cathode ray tube (CRT), or any other display capable of displaying graphics or video). The machine 1000 may also include an alphanumeric input device 1012 (e.g., a keyboard or keypad), a cursor control device 1014 (e.g., a mouse, a touchpad, a trackball, a joystick, a motion sensor, an eye tracking device, or other pointing instrument), a storage unit 1016, a signal generation device 1018 (e.g., a sound card, an amplifier, a speaker, a headphone jack, or any suitable combination thereof), and a network interface device 1020.

The storage unit 1016 includes the machine-readable medium 1022 (e.g., a tangible and non-transitory machine-readable storage medium) on which are stored the instructions 1024 embodying any one or more of the methodologies or functions described herein, including, for example, any of the descriptions of FIGS. 1-9. The instructions 1024 may also reside, completely or at least partially, within the main memory 1004, within the processor 1002 (e.g., within the processor's cache memory), or both, before or during execution thereof by the machine 1000. The instructions 1024 may also reside in the static memory 1006.

Accordingly, the main memory 1004 and the processor 1002 may be considered machine-readable media 1022 (e.g., tangible and non-transitory machine-readable media). The instructions 1024 may be transmitted or received over a network 1026 via the network interface device 1020. For example, the network interface device 1020 may communicate the instructions 1024 using any one or more transfer protocols (e.g., HTTP). The machine 1000 may also represent example means for performing any of the functions described herein, including the processes described in FIGS. 1-9.

In some example embodiments, the machine 1000 may be a portable computing device, such as a smart phone or tablet computer, and have one or more additional input components (e.g., sensors or gauges) (not shown). Examples of such input components include an image input component (e.g., one or more cameras), an audio input component (e.g., a microphone), a direction input component (e.g., a compass), a location input component (e.g., a GPS receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium 1022 able to store data temporarily or permanently and may be taken to include, but not be limited to, random-access memory (RAM), read-only memory (ROM), buffer memory, flash memory, and cache memory. While the machine-readable medium 1022 is shown in an example embodiment to be a single medium, the term "machine-readable medium" should be taken to include a single medium or multiple media (e.g., a centralized or distributed database 115, or associated caches and servers) able to store instructions 1024. The term "machine-readable medium" shall also be taken to include any medium, or combination of multiple media, that is capable of storing the instructions 1024 for execution by the machine 1000, such that the instructions 1024, when executed by one or more processors of the machine 1000 (e.g., processor 1002), cause the machine 1000 to perform any one or more of the methodologies described herein, in whole or in part. Accordingly, a "machine-readable medium" refers to a single storage apparatus or device 130 or 150, as well as cloud-based storage systems or storage networks that include multiple storage apparatus or devices 130 or 150. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Furthermore, the machine-readable medium 1022 is non-transitory in that it does not embody a propagating signal. However, labeling the tangible machine-readable medium 1022 as "non-transitory" should not be construed to mean that the medium is incapable of movement; the medium should be considered as being transportable from one physical location to another. Additionally, since the machine-readable medium 1022 is tangible, the medium may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium 1022 or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor 1002 or a group of processors 1002) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor 1002 or other programmable processor 1002. It will be appreciated that the decision to implement a hardware module mechanically, in dedicated and permanently configured circuitry, or in temporarily configured circuitry (e.g., configured by software) may be driven by cost and time considerations.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses 1008) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 1002 that are temporarily configured (e.g., by software) or permanently configured to perform the relevant operations. Whether temporarily or permanently configured, such processors 1002 may constitute processor-implemented modules that operate to perform one or more operations or functions described herein. As used herein, "processor-implemented module" refers to a hardware module implemented using one or more processors 1002.

Similarly, the methods described herein may be at least partially processor-implemented, a processor 1002 being an example of hardware. For example, at least some of the operations of a method may be performed by one or more processors 1002 or processor-implemented modules. As used herein, "processor-implemented module" refers to a hardware module in which the hardware includes one or more processors 1002. Moreover, the one or more processors 1002 may also operate to support performance of the relevant operations in a "cloud computing" environment or as a "software as a service" (SaaS). For example, at least some of the operations may be performed by a group of computers (as examples of machines 1000 including processors 1002), with these operations being accessible via a network 1026 (e.g., the Internet) and via one or more appropriate interfaces (e.g., an API).

The performance of certain operations may be distributed among the one or more processors 1002, not only residing within a single machine 1000, but deployed across a number of machines 1000. In some example embodiments, the one or more processors 1002 or processor-implemented modules may be located in a single geographic location (e.g., within a home environment, an office environment, or a server farm). In other example embodiments, the one or more processors 1002 or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine 1000 (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A computing system configured to provide an interactive multi-dimensional visualization of a plurality of data items to enable efficient assessment of data item alignment including time-base assessment, the system comprising:
a computer readable storage medium having program instructions embodied therewith; and
one or more processors configured to execute the program instructions to cause the computing system to:
access a database storing a plurality of data items and associated characteristics, wherein:
the data items are representative of respective assets having respective values,
the characteristics comprise time series with values at a plurality of points in time,
the characteristics comprise at least a first type of characteristic and a second type of characteristic, and
the characteristics are useable for determining scores of the data items according to a plurality of dimensions;
analyze a first data item of the plurality of data items and the values of the first type of characteristic associated with the first data item to determine a first set of scores of a first type including:
a first-dimension score of the first data item at a first point in time,
a second-dimension score of the first data item at the first point in time,
a third-dimension score of the first data item at the first point in time,
a first-dimension score of the first data item at a second point in time,
a second-dimension score of the first data item at the second point in time, and
a third-dimension score of the first data item at the second point in time;
analyze a second data item of the plurality of data items and the values of the first type of characteristic associated with the second data item to determine a second set of scores of the first type including:
a first-dimension score of the second data item at the first point in time,
a second-dimension score of the second data item at the first point in time,
a third-dimension score of the second data item at the first point in time,
a first-dimension score of the second data item at the second point in time,
a second-dimension score of the second data item at the second point in time, and
a third-dimension score of the second data item at the second point in time;
determine, based on all the first-dimension scores of the first type at the first point in time, a first-dimension weighted average score at the first point in time, wherein the first-dimension weighted average score is calculated by weighting the first-dimension scores at the first point in time by the values of the respective associated assets;
determine, based on all the second-dimension scores of the first type at the first point in time, a second-dimension weighted average score at the first point in time, wherein the second-dimension weighted average score is calculated by weighting the second-dimension scores at the first point in time by the values of the respective associated assets;
determine, based on all the third-dimension scores of the first type at the first point in time, a third-dimension weighted average score at the first point in time, wherein the third-dimension weighted average score is calculated by weighting the third-dimension scores at the first point in time by the values of the respective associated assets;
determine, based on all the first-dimension scores of the first type at the second point in time, a first-dimension weighted average score at the second point in time, wherein the first-dimension weighted average score is calculated by weighting the first-dimension scores at the second point in time by the values of the respective associated assets;
determine, based on all the second-dimension scores of the first type at the second point in time, a second-dimension weighted average score at the second point in time, wherein the second-dimension weighted average score is calculated by weighting the second-dimension scores at the second point in time by the values of the respective associated assets;
determine, based on all the third-dimension scores of the first type at the second point in time, a third-dimension weighted average score at the second point in time, wherein the third-dimension weighted average score is calculated by weighting the third-dimension scores at the second point in time by the values of the respective associated assets;
generate an interactive user interface including:
an interactive visualization of three perpendicular axes representing three dimensions including a first dimension represented by an x-axis, a second dimension represented by a y-axis, and a third dimension represented by a z-axis;
an interactive scrollbar that includes indications of at least the first point in time and the second point in time, wherein the first point in time is initially selected;
a first circle representing the first data item, wherein:
the first circle is sized based on the value of the asset at the first point in time corresponding to the first data item relative to the combined value of the assets corresponding to both the first and second data items, and
the first circle is positioned in the interactive user interface relative to the three perpendicular axes and according to the first set of scores of the first type including the first-dimension score of the first data item at the first point in time, the second-dimension score of the first data item at the first point in time, and the third-dimension score of the first data item at the first point in time;
a second circle representing the second data item, wherein:
the second circle is sized based on the value of the asset at the first point in time corresponding to the second data item relative to the combined value of the assets corresponding to both the first and second data items, and
the second circle is positioned in the interactive user interface relative to the three perpendicular axes and according to the second set of scores of the first type including the first-dimension score of the second data item at the first point in time, the second-dimension score of the second data item at the first point in time, and the third-dimension score of the second data item at the first point in time; and a square or other indicator representing a weighted average of the first and second data items, wherein the square or other indicator is positioned in the interactive user interface relative to the three perpendicular axes and according to the first-dimension weighted average score at the first point in time, the second-dimension weighted average score at the first point in time, and the third-dimension weighted average score at the first point in time; and in response to a user input to the interactive scrollbar selecting the second point in time, update the interactive user interface dynamically by at least:

repositioning the first circle representing the first data item, wherein the first circle is repositioned in the interactive user interface relative to the three perpendicular axes and according to the first-dimension score of the first data item at the second point in time, the second-dimension score of the first data item at the second point in time, and the third-dimension score of the first data item at the second point in time;

repositioning the second circle representing the second data item, wherein the second circle is repositioned in the interactive user interface relative to the three perpendicular axes and according to the first-dimension score of the second data item at the second point in time, the second-dimension score of the second data item at the second point in time, and the third-dimension score of the second data item at the second point in time; and repositioning the square or other indicator representing the weighted average of the first and second data items, wherein the square or other indicator is repositioned in the interactive user interface relative to the three perpendicular axes and according to the first-dimension weighted average score at the second point in time, the second-dimension weighted average score at the second point in time, and the third-dimension weighted average score at the second point in time.

2. The computing system of claim 1, wherein the interactive user interface further includes:
a first set of reference lines indicating a positioning of the first circle along at least one of the three perpendicular axes;
a second set of reference lines indicating a positioning of the second circle along at least one of the three perpendicular axes; and
a third set of reference lines indicating a positioning of the third circle along at least one of the three perpendicular axes.

3. The computing system of claim 2, wherein the one or more processors are further configured to execute the program instructions to cause the computing system to:
further in response to the user input to the interactive scrollbar selecting the second point in time, update the interactive user interface by at least:
displaying a first arrow or vector indicating a movement of the first circle as a result of the repositioning of the first circle;
displaying a second arrow or vector indicating a movement of the second circle as a result of the repositioning of the second circle; and
displaying a third arrow or vector indicating a movement of the third circle as a result of the repositioning of the third circle.

4. The computing system of claim 3, wherein the one or more processors are further configured to execute the program instructions to cause the computing system to:
further in response to the user input to the interactive scrollbar selecting the second point in time, update the interactive user interface by at least:
animating the movements of the first, second, and third circles as a result of the repositionings.

5. The computing system of claim 4, wherein the one or more processors are further configured to execute the program instructions to cause the computing system to:
normalize all the first-dimension scores;
normalize all the second-dimension scores; and
normalize all the third-dimension scores,
wherein first circle, the second circle, and the square or other indicator three perpendicular axes positioned in the interactive user interface in part based on normalized scores.

6. The computing system of claim 5, wherein the one or more processors are further configured to execute the program instructions to cause the computing system to:
analyze the first data item of the plurality of data items and the values of the second type of characteristic associated with the first data item to determine a first set of scores of a second type including:
a first-dimension score of the first data item at the first point in time,
a second-dimension score of the first data item at the first point in time,
a third-dimension score of the first data item at the first point in time,
a first-dimension score of the first data item at the second point in time,
a second-dimension score of the first data item at the second point in time, and
a third-dimension score of the first data item at the second point in time and
analyze the second data item of the plurality of data items and the values of the second type of characteristic associated with the second data item to determine a second set of scores of the second type including:
a first-dimension score of the second data item at the first point in time,
a second-dimension score of the second data item at the first point in time,
a third-dimension score of the second data item at the first point in time,
a first-dimension score of the second data item at the second point in time,
a second-dimension score of the second data item at the second point in time, and
a third-dimension score of the second data item at the second point in time,
wherein the interactive user interface further includes:
a third circle representing the first data item, wherein:
the third circle is sized based on the value of the asset at the first point in time corresponding to the first data item relative to the combined value of the assets corresponding to both the first and second data items,
the third circle is colored differently from the first circle, and
the third circle is positioned in the interactive user interface relative to the three perpendicular axes and according to the first set of scores of the second type including the first-dimension score of the first data item at the first point in time, the second-dimension score of the first data item at the first point in time, and the third-dimension score of the first data item at the first point in time; and a fourth circle representing the second data item, wherein:
the fourth circle is sized based on the value of the asset at the first point in time corresponding to the second data item relative to the combined value of the assets corresponding to both the first and second data items,
the fourth circle is colored differently from the second circle, and
the fourth circle is positioned in the interactive user interface relative to the three perpendicular axes and according to the second set of scores of the second type including the first-dimension score of the second data item at the first point in time, the second-dimension score of the second data item at the first point in time, and the third-dimension score of the second data item at the first point in time.

7. The computing system of claim 6, wherein the one or more processors are further configured to execute the program instructions to cause the computing system to:
determine, based on all the first-dimension scores of the first type at the first point in time and from the first and second sets of scores of the second type, a second type first-dimension weighted average score at the first point in time, wherein the first-dimension weighted average score is calculated by weighting the first-dimension scores at the first point in time by the values of the respective associated assets;
determine, based on all the second-dimension scores of the first type at the first point in time and from the first and second sets of scores of the second type, a second type second-dimension weighted average score at the first point in time, wherein the second-dimension weighted average score is calculated by weighting the second-dimension scores at the first point in time by the values of the respective associated assets; and
determine, based on all the third-dimension scores of the first type at the first point in time and from the first and second sets of scores of the second type, a second type third-dimension weighted average score at the first point in time, wherein the third-dimension weighted average score is calculated by weighting the third-dimension scores at the first point in time by the values of the respective associated assets,
wherein the interactive user interface further includes:
a second square or other indicator representing a second type weighted average of the first and second data items, wherein:
the second square or other indicator is colored differently from the first square or other indicator, and
the second square or other indicator is positioned in the interactive user interface relative to the three perpendicular axes and according to the second type first-dimension weighted average score at the first point in time, the second type second-dimension weighted average score at the first point in time, and the second type third-dimension weighted average score at the first point in time.

8. An interactive multi-dimensional visualization computing system for display of time-sensitive data items, the computing system comprising:
a computer readable storage medium having program instructions embodied therewith; and
one or more processors configured to execute the program instructions to cause the computing system to:
access a database storing a plurality of data items and associated characteristics, the associated characteristics of each of the plurality of data items comprising:
an associated asset value,
a first-dimension score,
a second-dimension score,
a third-dimension score, and
a first associated time value;
determine a first-dimension weighted average score of the plurality of data items at a first point in time by weighting each of the associated first-dimension scores of each of the plurality of data items by each of the associated asset values, at each of the first associated time values;
determine a second-dimension weighted average score of the plurality of data items at a first point in time by weighting each of the associated second-dimension scores of each of the plurality of data items by each of the associated asset values, at each of the first associated time values;
determine a third-dimension weighted average score of the plurality of data items at a first point in time by weighting each of the associated third-dimension scores of each of the plurality of data items by each of the associated asset values, at each of the first associated time values;
generate an interactive user interface comprising:
an interactive visualization of three perpendicular axes representing three dimensions including a first dimension represented by an x-axis, a second dimension represented by a y-axis, and a third dimension represented by a z-axis, the three axes intersecting at an origin point;
a first geometric shape representing the first data item, wherein:
the first geometric shape is sized based on the associated asset value at the first point in time of the first data item relative to a combined value of the associated asset values of each of the plurality of data items, and
the first geometric shape is positioned in the interactive user interface:
relative to the x-axis based on the associated first-dimension score of the first data item at the first associated time value,
relative to the y-axis based on the associated second-dimension score of the first data item at the first associated time value,
relative to the z-axis based on the associated third-dimension score of the first data item at the first associated time value,
a second geometric shape representing the second data item, wherein:
the second geometric shape is sized based on the associated asset value at the first point in time of the second data item relative to the combined value of the associated asset values of each of the plurality of data items, and the second geometric shape is positioned in the interactive user interface:
relative to the x-axis based on the associated first-dimension score of the second data item at the first associated time value,
relative to the y-axis based on the associated second-dimension score of the second data item at the first associated time value,
relative to the z-axis based on the associated third-dimension score of the second data item at the first associated time value; and
a visual indicator representing a center of gravity of the plurality of data items, wherein the visual indicator is positioned in the interactive user interface:
relative to the x-axis based on the first-dimension weighted average score at the first associated time value,
relative to the y-axis based on the second-dimension weighted average score at the first associated time value,
relative to the z-axis based on the third-dimension weighted average score at the first associated time value; and
dynamically animate, in response to a user input to the interactive user interface, an orientation and location of the three axes, the first and second geometric shapes, and the visual indicator, wherein during the animation a relative position of each of the first and second shapes and visual indicator relative to the three axes is maintained, thereby allowing a user to manipulate a three-dimensional view of the interactive user interface.

9. The visualization computing system of claim 8, wherein the user input to the interactive user interface comprises a click and drag.

10. The visualization computing system of claim 8, wherein the animation continues until the release of the click.

11. The visualization computing system of claim 8, wherein the animation continues only during the drag input.

12. The visualization computing system of claim 8, wherein the interactive interface further comprises an interactive scrollbar that includes indications of at least the first point in time and the second point in time, wherein the first point in time is initially selected.

13. The visualization computing system of claim 12, wherein in response to a user input to the interactive scrollbar selecting the second point in time, update the interactive user interface by at least:
repositioning the first geometric shape representing the first data item, wherein the first geometric shape is repositioned in the interactive user interface relative to the three perpendicular axes and according to the first-dimension score of the first data item at the second point in time, the second-dimension score of the first data item at the second point in time, and the third-dimension score of the first data item at the second point in time;
repositioning the second geometric shape representing the second data item, wherein the second geometric shape is repositioned in the interactive user interface relative to the three perpendicular axes and according to the first-dimension score of the second data item at the second point in time, the second-dimension score of the second data item at the second point in time, and the third-dimension score of the second data item at the second point in time; and
repositioning the visual indicator representing the weighted average of the first and second data items, wherein the visual indicator is repositioned in the interactive user interface relative to the three perpendicular axes and according to the first-dimension weighted average score at the second point in time, the second-dimension weighted average score at the second point in time, and the third-dimension weighted average score at the second point in time.

14. The computing system of claim 1, wherein the one or more processors are further configured to execute the program instructions to cause the computing system to:
dynamically animate, in response to a user input to the interactive user interface, an orientation and location of the three perpendicular axes, the first and second circles, and the square or other indicator representing the weighted average, wherein during the animation a relative position of each of the first and second shapes and square or other indicator relative to the three perpendicular axes is maintained, thereby appearing to allow a user to manipulate a three-dimensional view of the interactive user interface.

* * * * *